United States Patent
Lehane et al.

(10) Patent No.: US 7,945,661 B2
(45) Date of Patent: May 17, 2011

(54) REAL TIME MONITORING OF TCP FLOWS

(75) Inventors: Andrew Lehane, Milnathort (GB);
Martin Curran-Gray, Fife (GB); Colin Arthur, Carluke (GB); Demessie Girma, Glasgow (GB)

(73) Assignee: JDS Uniphase Corporation, Milpitas, CA (US)

( * ) Notice: Subject to any disclaimer, the term of this patent is extended or adjusted under 35 U.S.C. 154(b) by 976 days.

(21) Appl. No.: 11/519,483

(22) Filed: Sep. 12, 2006

(65) Prior Publication Data
US 2007/0070916 A1    Mar. 29, 2007

(30) Foreign Application Priority Data

Sep. 23, 2005  (GB) .................................. 0519393.3

(51) Int. Cl.
*G06F 15/16*    (2006.01)
*H04L 12/28*    (2006.01)
(52) U.S. Cl. ........ 709/224; 370/394; 370/400; 709/230; 709/231; 709/242
(58) Field of Classification Search ................... 709/224
See application file for complete search history.

(56) References Cited

U.S. PATENT DOCUMENTS

| | | | | |
|---|---|---|---|---|
| 7,072,342 B1* | 7/2006 | Elnathan | ....................... | 370/394 |
| 7,120,149 B2* | 10/2006 | Salamat | ....................... | 370/394 |
| 7,209,482 B1* | 4/2007 | Rahim | ........................... | 370/394 |
| 7,417,991 B1* | 8/2008 | Crawford et al. | ............. | 370/394 |
| 7,496,662 B1* | 2/2009 | Roesch et al. | ................. | 709/224 |
| 7,676,611 B2* | 3/2010 | Hui et al. | ......................... | 710/58 |
| 7,764,679 B2* | 7/2010 | MeLampy et al. | ............ | 370/389 |
| 2002/0174216 A1* | 11/2002 | Shorey et al. | ................. | 709/224 |
| 2003/0012200 A1* | 1/2003 | Salamat | ......................... | 370/394 |
| 2003/0016627 A1* | 1/2003 | MeLampy et al. | ............ | 370/235 |
| 2004/0058682 A1* | 3/2004 | Kitchin | ......................... | 455/445 |
| 2004/0073655 A1* | 4/2004 | Kan et al. | ...................... | 709/224 |
| 2005/0180327 A1* | 8/2005 | Banerjee et al. | .............. | 370/236 |
| 2006/0068769 A1* | 3/2006 | Adya et al. | ..................... | 455/418 |
| 2006/0168205 A1* | 7/2006 | Barron et al. | ................. | 709/224 |

FOREIGN PATENT DOCUMENTS

| | | |
|---|---|---|
| EP | 1 067 744 | 1/2001 |
| EP | 1 111 871 | 6/2001 |
| JP | 4-10727 | 1/1992 |

* cited by examiner

*Primary Examiner* — Ashok B Patel
*Assistant Examiner* — Linglan Edwards
(74) *Attorney, Agent, or Firm* — Volentine & Whitt, PLLC

(57) ABSTRACT

A method for real time monitoring of at least one TCP flow involves monitoring TCP packets flowing past a particular point in a TCP network. A flow trace including at least source and destination addresses for each TCP packet is determined and a packet record for each monitored TCP packet within a determined flow trace is created. Each of the packet records includes at least a transmitted order number and an actual received sequence number, from which an expected received sequence number for each packet record is determined and stored in the packet record. The difference between the expected received sequence number for each packet record and the expected received sequence number for the previous packet record is used to thereby determine by how much a particular packet was moved out of sequence.

18 Claims, 14 Drawing Sheets

| Timestamp | | Source | | Destination | | OP | Seq | Ack | IPID | Packet Length |
|---|---|---|---|---|---|---|---|---|---|---|
| Secs | Usecs | Address | Port | Address | Port | | | | | |
| 1125264298 | 160003 | 10.0.0.2 | 1789 | 10.0.0.6 | 35427 | 1 | 3816962545 | 3811057447 | 43099 | 1448 |
| 1125264298 | 160007 | 10.0.0.2 | 1789 | 10.0.0.6 | 35427 | 2 | 3816963993 | 3811057447 | 43100 | 1448 |
| 1125264298 | 275604 | 10.0.0.6 | 35427 | 10.0.0.2 | 1789 | 1 | 3811057447 | 3816963993 | 36800 | 0 |
| 1125264298 | 275636 | 10.0.0.6 | 35427 | 10.0.0.2 | 1789 | 2 | 3811057447 | 3816965441 | 36801 | 0 |
| 1125264298 | 277983 | 10.0.0.2 | 1789 | 10.0.0.6 | 35427 | 3 | 3816965441 | 3811057447 | 43101 | 1448 |
| 1125264298 | 278330 | 10.0.0.2 | 1789 | 10.0.0.6 | 35427 | 4 | 3816966889 | 3811057447 | 43102 | 1448 |
| 1125264298 | 278332 | 10.0.0.2 | 1789 | 10.0.0.6 | 35427 | 5 | 3816969785 | 3811057447 | 43104 | 1448 |
| 1125264298 | 278334 | 10.0.0.2 | 1789 | 10.0.0.6 | 35427 | 6 | 3816968337 | 3811057447 | 43103 | 1448 |
| 1125264298 | 395590 | 10.0.0.6 | 35427 | 10.0.0.2 | 1789 | 3 | 3811057447 | 3816966889 | 36802 | 0 |
| 1125264298 | 395619 | 10.0.0.6 | 35427 | 10.0.0.2 | 1789 | 4 | 3811057447 | 3816968337 | 36803 | 0 |
| 1125264298 | 395641 | 10.0.0.6 | 35427 | 10.0.0.2 | 1789 | 5 | 3811057447 | 3816968337 | 36804 | 0 |
| 1125264298 | 395671 | 10.0.0.6 | 35427 | 10.0.0.2 | 1789 | 6 | 3811057447 | 3816971233 | 36805 | 0 |
| 1125264298 | 398070 | 10.0.0.2 | 1789 | 10.0.0.6 | 35427 | 7 | 3816971233 | 3811057447 | 43105 | 1448 |
| 1125264298 | 398427 | 10.0.0.2 | 1789 | 10.0.0.6 | 35427 | 8 | 3816972681 | 3811057447 | 43106 | 1448 |
| 1125264298 | 398428 | 10.0.0.2 | 1789 | 10.0.0.6 | 35427 | 9 | 3816974129 | 3811057447 | 43107 | 1448 |
| 1125264298 | 398430 | 10.0.0.2 | 1789 | 10.0.0.6 | 35427 | 10 | 3816975577 | 3811057447 | 43108 | 1448 |
| 1125264298 | 398432 | 10.0.0.2 | 1789 | 10.0.0.6 | 35427 | 11 | 3816968337 | 3811057447 | 43109 | 1448 |
| 1125264298 | 398434 | 10.0.0.2 | 1789 | 10.0.0.6 | 35427 | 12 | 3816977025 | 3811057447 | 43110 | 1448 |
| 1125264298 | 515588 | 10.0.0.6 | 35427 | 10.0.0.2 | 1789 | 7 | 3811057447 | 3816972681 | 36806 | 0 |
| 1125264298 | 515616 | 10.0.0.6 | 35427 | 10.0.0.2 | 1789 | 8 | 3811057447 | 3816974129 | 36807 | 0 |
| 1125264298 | 515638 | 10.0.0.6 | 35427 | 10.0.0.2 | 1789 | 9 | 3811057447 | 3816975577 | 36808 | 0 |
| 1125264298 | 515661 | 10.0.0.6 | 35427 | 10.0.0.2 | 1789 | 10 | 3811057447 | 3816977025 | 36809 | 0 |
| 1125264298 | 515673 | 10.0.0.6 | 35427 | 10.0.0.2 | 1789 | 11 | 3811057447 | 3816977025 | 36810 | 0 |
| 1125264298 | 515700 | 10.0.0.6 | 35427 | 10.0.0.2 | 1789 | 12 | 3811057447 | 3816978473 | 36811 | 0 |
| 1125264298 | 517947 | 10.0.0.2 | 1789 | 10.0.0.6 | 35427 | 13 | 3816978473 | 3811057447 | 43111 | 1448 |
| 1125264298 | 518325 | 10.0.0.2 | 1789 | 10.0.0.6 | 35427 | 14 | 3816979921 | 3811057447 | 43112 | 1448 |
| 1125264298 | 518327 | 10.0.0.2 | 1789 | 10.0.0.6 | 35427 | 15 | 3816981369 | 3811057447 | 43113 | 1448 |
| 1125264298 | 518329 | 10.0.0.2 | 1789 | 10.0.0.6 | 35427 | 16 | 3816982817 | 3811057447 | 43114 | 1448 |
| 1125264298 | 518330 | 10.0.0.2 | 1789 | 10.0.0.6 | 35427 | 17 | 3816984265 | 3811057447 | 43115 | 1448 |
| 1125264298 | 518725 | 10.0.0.2 | 1789 | 10.0.0.6 | 35427 | 18 | 3816985713 | 3811057447 | 43116 | 1408 |
| 1125264298 | 635583 | 10.0.0.6 | 35427 | 10.0.0.2 | 1789 | 13 | 3811057447 | 3816979921 | 36812 | 0 |
| 1125264298 | 635611 | 10.0.0.6 | 35427 | 10.0.0.2 | 1789 | 14 | 3811057447 | 3816981369 | 36813 | 0 |
| 1125264298 | 635634 | 10.0.0.6 | 35427 | 10.0.0.2 | 1789 | 15 | 3811057447 | 3816982817 | 36814 | 0 |
| 1125264298 | 635657 | 10.0.0.6 | 35427 | 10.0.0.2 | 1789 | 16 | 3811057447 | 3816984265 | 36815 | 0 |
| 1125264298 | 635685 | 10.0.0.6 | 35427 | 10.0.0.2 | 1789 | 17 | 3811057447 | 3816987121 | 36816 | 0 |
| 1125264298 | 637902 | 10.0.0.2 | 1789 | 10.0.0.6 | 35427 | 19 | 3816987121 | 3811057447 | 43117 | 1448 |
| 1125264298 | 638254 | 10.0.0.2 | 1789 | 10.0.0.6 | 35427 | 20 | 3816990017 | 3811057447 | 43119 | 1448 |
| 1125264298 | 638622 | 10.0.0.2 | 1789 | 10.0.0.6 | 35427 | 21 | 3816988569 | 3811057447 | 43118 | 1448 |
| 1125264298 | 638624 | 10.0.0.2 | 1789 | 10.0.0.6 | 35427 | 22 | 3816991465 | 3811057447 | 43120 | 1448 |
| 1125264298 | 638626 | 10.0.0.2 | 1789 | 10.0.0.6 | 35427 | 23 | 3816992913 | 3811057447 | 43121 | 1448 |
| 1125264298 | 638628 | 10.0.0.2 | 1789 | 10.0.0.6 | 35427 | 24 | 3816994361 | 3811057447 | 43122 | 952 |
| 1125264298 | 638630 | 10.0.0.2 | 1789 | 10.0.0.6 | 35427 | 25 | 3816995313 | 3811057447 | 43123 | 1448 |
| 1125264298 | 638631 | 10.0.0.2 | 1789 | 10.0.0.6 | 35427 | 26 | 3816998209 | 3811057447 | 43125 | 1448 |
| 1125264298 | 638633 | 10.0.0.2 | 1789 | 10.0.0.6 | 35427 | 27 | 3816996761 | 3811057447 | 43124 | 1448 |

*Fig. 7*

Flow Trace 1) 10.0.0.2:1789 to 10.0.0.6:35427

| Timestamp (secs) | Timestamp (usecs) | OP | Seq | IPID | Packet Length |
|---|---|---|---|---|---|
| 1125264298 | 160003 | 1 | 3816962545 | 43099 | 1448 |
| 1125264298 | 160007 | 2 | 3816963993 | 43100 | 1448 |
| 1125264298 | 277983 | 3 | 3816965441 | 43101 | 1448 |
| 1125264298 | 278330 | 4 | 3816966889 | 43102 | 1448 |
| 1125264298 | 278332 | 5 | 3816969785 | 43104 | 1448 |
| 1125264298 | 278334 | 6 | 3816968337 | 43103 | 1448 |
| 1125264298 | 398070 | 7 | 3816971233 | 43105 | 1448 |
| 1125264298 | 398427 | 8 | 3816972681 | 43106 | 1448 |
| 1125264298 | 398428 | 9 | 3816974129 | 43107 | 1448 |
| 1125264298 | 398430 | 10 | 3816975577 | 43108 | 1448 |
| 1125264298 | 398432 | 11 | 3816968337 | 43109 | 1448 |
| 1125264298 | 398434 | 12 | 3816977025 | 43110 | 1448 |
| 1125264298 | 517947 | 13 | 3816978473 | 43111 | 1448 |
| 1125264298 | 518325 | 14 | 3816979921 | 43112 | 1448 |
| 1125264298 | 518327 | 15 | 3816981369 | 43113 | 1448 |
| 1125264298 | 518329 | 16 | 3816982817 | 43114 | 1448 |
| 1125264298 | 518330 | 17 | 3816984265 | 43115 | 1448 |
| 1125264298 | 518725 | 18 | 3816985713 | 43116 | 1408 |
| 1125264298 | 637902 | 19 | 3816987121 | 43117 | 1448 |
| 1125264298 | 638254 | 20 | 3816990017 | 43119 | 1448 |
| 1125264298 | 638622 | 21 | 3816988569 | 43118 | 1448 |
| 1125264298 | 638624 | 22 | 3816991465 | 43120 | 1448 |
| 1125264298 | 638626 | 23 | 3816992913 | 43121 | 1448 |
| 1125264298 | 638628 | 24 | 3816994361 | 43122 | 952 |
| 1125264298 | 638630 | 25 | 3816995313 | 43123 | 1448 |
| 1125264298 | 638631 | 26 | 3816998209 | 43125 | 1448 |
| 1125264298 | 638633 | 27 | 3816996761 | 43124 | 1448 |

Flow Trace 2) 10.0.0.6:35427 to 10.0.0.2:1789

| Timestamp (secs) | Timestamp (usecs) | OP | Ack | IPID | Packet Length |
|---|---|---|---|---|---|
| 1125264298 | 275604 | 1 | 3816963993 | 36800 | 0 |
| 1125264298 | 275636 | 2 | 3816965441 | 36801 | 0 |
| 1125264298 | 395590 | 3 | 3816966889 | 36802 | 0 |
| 1125264298 | 395619 | 4 | 3816968337 | 36803 | 0 |
| 1125264298 | 395641 | 5 | 3816968337 | 36804 | 0 |
| 1125264298 | 395671 | 6 | 3816971233 | 36805 | 0 |
| 1125264298 | 515588 | 7 | 3816972681 | 36806 | 0 |
| 1125264298 | 515616 | 8 | 3816974129 | 36807 | 0 |
| 1125264298 | 515638 | 9 | 3816975577 | 36808 | 0 |
| 1125264298 | 515661 | 10 | 3816977025 | 36809 | 0 |
| 1125264298 | 515673 | 11 | 3816977025 | 36810 | 0 |
| 1125264298 | 515700 | 12 | 3816978473 | 36811 | 0 |
| 1125264298 | 635583 | 13 | 3816979921 | 36812 | 0 |
| 1125264298 | 635611 | 14 | 3816981369 | 36813 | 0 |
| 1125264298 | 635634 | 15 | 3816982817 | 36814 | 0 |
| 1125264298 | 635657 | 16 | 3816984265 | 36815 | 0 |
| 1125264298 | 635685 | 17 | 3816987121 | 36816 | 0 |

*Fig. 8*

| Timestamp (secs) | Timestamp (usecs) | OP | Ack | IPID | Packet Length | EP |
|---|---|---|---|---|---|---|
| 1125264298 | 160003 | 2 | 3816962545 | 43099 | 1448 | 2 |
| 1125264298 | 160007 | 3 | 3816963993 | 43100 | 1448 | 3 |
| 1125264298 | 277983 | 4 | 3816965441 | 43101 | 1448 | 4 |
| 1125264298 | 278330 | 5 | 3816966889 | 43102 | 1448 | 5 |
| 1125264298 | 278332 | 6 | 3816969785 | 43104 | 1448 | 7 |
| 1125264298 | 278334 | 7 | 3816968337 | 43103 | 1448 | 6 |
| 1125264298 | 398070 | 8 | 3816971233 | 43105 | 1448 | 8 |
| 1125264298 | 398427 | 9 | 3816972681 | 43106 | 1448 | 9 |
| 1125264298 | 398428 | 10 | 3816974129 | 43107 | 1448 | 10 |
| 1125264298 | 398430 | 11 | 3816975577 | 43108 | 1448 | 11 |
| 1125264298 | 398432 | 12 | 3816968337 | 43109 | 1448 | 6 |
| 1125264298 | 398434 | 13 | 3816977025 | 43110 | 1448 | 12 |
| 1125264298 | 517947 | 14 | 3816978473 | 43111 | 1448 | 13 |
| 1125264298 | 518325 | 15 | 3816979921 | 43112 | 1448 | 14 |
| 1125264298 | 518327 | 16 | 3816981369 | 43113 | 1448 | 15 |
| 1125264298 | 518329 | 17 | 3816982817 | 43114 | 1448 | 16 |
| 1125264298 | 518330 | 18 | 3816984265 | 43115 | 1448 | 17 |
| 1125264298 | 518725 | 19 | 3816985713 | 43116 | 1408 | 18 |
| 1125264298 | 637902 | 20 | 3816987121 | 43117 | 1448 | 19 |
| 1125264298 | 638254 | 21 | 3816990017 | 43119 | 1448 | 21 |
| 1125264298 | 638622 | 22 | 3816988569 | 43118 | 1448 | 20 |
| 1125264298 | 638624 | 23 | 3816991465 | 43120 | 1448 | 22 |
| 1125264298 | 638626 | 24 | 3816992913 | 43121 | 1448 | 23 |
| 1125264298 | 638628 | 25 | 3816994361 | 43122 | 952 | 24 |
| 1125264298 | 638630 | 26 | 3816995313 | 43123 | 1448 | 25 |
| 1125264298 | 638631 | 27 | 3816998209 | 43125 | 1448 | 27 |
| 1125264298 | 638633 | 28 | 3816996761 | 43124 | 1448 | 26 |

*Fig. 9*

| OP | EP | ∂OP | ∂EP | ∂EP - ∂OP | Timestamp (secs) | Timestamp (usecs) | Seq | IPID | Packet Length |
|---|---|---|---|---|---|---|---|---|---|
| 2 | 2 | | | | 1125264298 | 160003 | 3816962545 | 43099 | 1448 |
| 3 | 3 | 1 | 1 | 0 | 1125264298 | 160007 | 3816963993 | 43100 | 1448 |
| 4 | 4 | 1 | 1 | 0 | 1125264298 | 277983 | 3816965441 | 43101 | 1448 |
| 5 | 5 | 1 | 1 | 0 | 1125264298 | 278330 | 3816966889 | 43102 | 1448 |
| 6 | 7 | 1 | 2 | 1 | 1125264298 | 278332 | 3816969785 | 43104 | 1448 |
| 7 | 6 | 1 | -1 | -2 | 1125264298 | 278334 | 3816968337 | 43103 | 1448 |
| 8 | 8 | 1 | 2 | 1 | 1125264298 | 398070 | 3816971233 | 43105 | 1448 |
| 9 | 9 | 1 | 1 | 0 | 1125264298 | 398427 | 3816972681 | 43106 | 1448 |
| 10 | 10 | 1 | 1 | 0 | 1125264298 | 398428 | 3816974129 | 43107 | 1448 |
| 11 | 11 | 1 | 1 | 0 | 1125264298 | 398430 | 3816975577 | 43108 | 1448 |
| 12 | 6 | 1 | -5 | -6 | 1125264298 | 398432 | 3816968337 | 43109 | 1448 |
| 13 | 12 | 1 | 6 | 5 | 1125264298 | 398434 | 3816977025 | 43110 | 1448 |
| 14 | 13 | 1 | 1 | 0 | 1125264298 | 517947 | 3816978473 | 43111 | 1448 |
| 15 | 14 | 1 | 1 | 0 | 1125264298 | 518325 | 3816979921 | 43112 | 1448 |
| 16 | 15 | 1 | 1 | 0 | 1125264298 | 518327 | 3816981369 | 43113 | 1448 |
| 17 | 16 | 1 | 1 | 0 | 1125264298 | 518329 | 3816982817 | 43114 | 1448 |
| 18 | 17 | 1 | 1 | 0 | 1125264298 | 518330 | 3816984265 | 43115 | 1448 |
| 19 | 18 | 1 | 1 | 0 | 1125264298 | 518725 | 3816985713 | 43116 | 1408 |
| 20 | 19 | 1 | 1 | 0 | 1125264298 | 637902 | 3816987121 | 43117 | 1448 |
| 21 | 21 | 1 | 2 | 1 | 1125264298 | 638254 | 3816990017 | 43119 | 1448 |
| 22 | 20 | 1 | -1 | -2 | 1125264298 | 638622 | 3816988569 | 43118 | 1448 |
| 23 | 22 | 1 | 2 | 1 | 1125264298 | 638624 | 3816991465 | 43120 | 1448 |
| 24 | 23 | 1 | 1 | 0 | 1125264298 | 638626 | 3816992913 | 43121 | 1448 |
| 25 | 24 | 1 | 1 | 0 | 1125264298 | 638628 | 3816994361 | 43122 | 952 |
| 26 | 25 | 1 | 1 | 0 | 1125264298 | 638630 | 3816995313 | 43123 | 1448 |
| 27 | 27 | 1 | 2 | 1 | 1125264298 | 638631 | 3816998209 | 43125 | 1448 |
| 28 | 26 | 1 | -1 | -2 | 1125264298 | 638633 | 3816996761 | 43124 | 1448 |

*Fig. 10*

REAL TIME MONITORING OF TCP FLOWS

The present invention relates to a method for real time monitoring of TCP flows, specifically providing the ability to perform accurate lightweight single point measurements, particularly, though not exclusively, for real time monitoring of multiple concurrent TCP flows.

BACKGROUND

Transmission Control Protocol (TCP) is an Internet Engineering Task Force (IETF) protocol that operates at the Open Standards Interconnect (OSI) layer 4 and is used for the majority of host-to-host Internet applications such as FTP (File Transfer Protocol), HTTP (Hypertext Transfer Protocol), news, telnet and e-mail. A working group within IETF (Internet Engineering Task Force) does standardization work on TCP/IP, (IP meaning "Internet Protocol") which is documented in "Requests for Comment" (RFC) numbers 793, 1122, 1146, 1644, 2018, 2581, 2861, 2883, 3168, 3390, 3517, 3540 and others.

TCP offers connection-orientated, guaranteed delivery of data using transmission sequence numbers that are positively acknowledged (ACK'd) by the receiving host (receiver). Flow control is performed via a sliding window mechanism; the receiver returns a "window" with every ACK indicating a range of acceptable sequence numbers beyond the last segment successfully received. The window indicates an allowed number of bytes that the sender may transmit into the network before receiving further permission.

Each TCP packet is accompanied by a sequence number, which is the packet's position in the sending host's (sender's) output buffer, measured in bytes from the beginning of the buffer, plus a random offset, which is chosen at the start of the connection to avoid simultaneous use of duplicate sequence number values.

If a sender doesn't receive an acknowledgment of a particular packet within a predetermined time (either because the packet never reached the receiver, or the ACK was never sent or because the ACK itself was lost), it automatically re-transmits the packet.

The Internet and its millions of users now depend upon the smooth operation of TCP. Clearly, some mechanism for large-scale monitoring of TCP would be extremely valuable in ensuring that performance is optimised, faults are easily identifiable, service level agreements are maintained by Internet Service Providers (ISPs), and end users can expect a guaranteed high quality of service.

There are, however, several difficulties when monitoring TCP flows. Firstly, the majority of flows are often short-lived, and secondly, there will be many millions of simultaneous concurrent active flows between the many hosts present on the Internet at any one time. Thus, any monitoring technique should be both simple and lightweight to implement. Furthermore, the implementation should preferably not consume costly resources and should be scaleable, so that it can be applied to many simultaneous concurrent flows and deployed in many places around the Internet without causing additional overhead itself.

Traditional measures used to monitor TCP performance include "Goodput", which is the amount of data received versus the amount transmitted; the amount transmitted includes retransmissions caused by losses in the network. Goodput provides a simple method of indicating the 'health' of a TCP connection, as retransmissions are an excess overhead on the network that should be avoided.

Goodput measures the volume of all the transmitted TCP payloads in a given flow by recording the first and last sequence numbers for a given direction in a flow. This provides the amount of traffic successfully transmitted and received during the lifetime of that flow. The calculation is adjusted to make allowance for the SYN and FIN signalling packets that signal start and end of the flow and increase the sequence number without transmitting any payload.

The traditional goodput measurement does not provide any indication of the point at which the transmission breakdown may have occurred, nor the severity of the breakdown that was present at each event. Goodput also fails to provide any method for identifying the location in a flow where a retransmission has occurred, nor does it indicate whether this retransmission was as a result of one single large event or many small events. Without knowing the timing and severity of each event, it is impossible to gauge or estimate the actual impact upon an end-user, as different amounts of transmission breakdown will have varying levels of impact.

A single point measurement technique is desirable from a network monitoring perspective. The Internet promotes multi-path routing, which results in, for example, an asymmetry of TCP flows, where the outgoing data packets may choose a different route from the resulting Acknowledgement packets. Therefore, a single point measurement technique should allow measurement of both data and ACK packets at geographically separate points. Further, single point measurements have no requirement for time synchronisation between measurement probes. Similarly there are no requirements for computationally expensive and bandwidth intensive real-time correlation of measurement data between probes. Time synchronizing a large number of measurement devices over a very wide area, and to a high degree of accuracy, is costly and would significantly increase the purchase price of the end-device.

Thus, the ability to perform accurate single point measurement of TCP goodput, loss and retransmission over time can be a very useful tool in IP network management. Such a tool should preferably be scaleable, low cost and easy to deploy. Moreover, the results from a number of geographically diverse measurements can help determine the location of a fault or congestion, allowing remedial action to be taken. Similarly, results can be used to measure the level of service attributed to individual flows, since loss measurements are key to service level agreements.

It is worth noting that IP networks do not enforce any rules regarding packet order during transit. An IP router is free to forward a packet from a flow before it has completed forwarding all of that packet's predecessors. Unfortunately, for TCP, reordering events can appear as though a packet has been lost followed by its eventual retransmission, thereby rendering errors in many performance measurements.

The term 'out-of-sequence packets' is therefore used to indicate packets that arrive at the receiver, for whatever reason, out of order with respect to their original transmitted order at the sending host (sender). In TCP, out of sequence packets can be as a result of loss followed by retransmission or due to reordering at any intermediate element in the IP network. A flow with a large number of out-of-sequence packets, whatever the reason, is indicative of poor transmission characteristics and hence a poor user experience.

A conventional measure of TCP retransmission takes the sum of all the TCP packet lengths actually transmitted and subtracts the goodput figure giving a value for retransmitted packets. By making this measurement near the TCP source it produces an accurate measure of the retransmissions caused by packet loss 'downstream' from that point in the flow.

However, if the measurement is made at a point where some packets may have already been lost, then the retransmission measurement will under report the value by the amount of the loss.

European Patent EP1111871 describes a mechanism for single point measurement of retransmission, loss, and goodput of TCP flows. For each TCP connection being monitored, a next expected sequence number value (NESN) is maintained and compared with the actual sequence number of a packet seen in that flow. If the sequence number is less than the NESN, a retransmission count is incremented by the size of the retransmitted TCP payload; if it is greater then the NESN, a loss counter is incremented by the size of the lost TCP payload.

The technique described in EP1111871, using analysis of the sequence numbers, enables an observer at an arbitrary monitoring point on a TCP connection to estimate the traffic that was originally sent by the transmitting node, even though some of this traffic may have already been lost. However, IP traffic is not guaranteed to arrive at the observation point in the order of transmission. Therefore out-of-sequence packets can be caused by loss followed by retransmission or packet reordering. Clearly, when taking measurements at the transmission source, before the packets traverse a switching device, no packet re-ordering can have occurred and the traditional calculation for retransmission based upon subtracting goodput from throughput will suffice. However, any measurements using this method at subsequent points in the network, after the packets have passed through one or more routers or switches, are likely to over estimate the amount of loss and retransmission by the amount of packet reordering that occurred.

Packet reordering can occur due to parallelism in the network, either at the link-level or switch level, or due to the dynamic nature of Internet routing. The most conservative study as disclosed in, "End-to-end Internet Packet Dynamics", IEEE/ACM Transactions on Networking, Paxon, June 1999 shows between 0.03% and 0.78% of packets reordered with between 0.15% and 4.9% of flows being affected. However, in "Measurement and classification of Out-of-Sequence Packets in a Tier-1 IP Backbone", Jaiswal et al; Proceedings of Internet Measurement Workshop, November 2002, noted much greater packet reordering probabilities of up to 5% of packets and 15% of flows affected. Preliminary research in "Packet Reordering is not Pathological Network Behaviour", Bennett et al, IEEE/ACM Transactions on Networking, December 1999 shows that much of this parallelism can be attributed to modern router architectures that use massive parallelism to support multi-gigabit line rates over a number of interface cards, and to link-level parallelism or "striping". It is often much cheaper, as well as offering a degree of redundancy, to install several slow links between a given source and destination than a single fast link.

The worst case flow examined in "Measurement and classification of Out-of-Sequence Packets in a Tier-1 IP Backbone", exhibited 4.67% of all packets out-of-sequence with 16.70% of those out-of-sequence packets as actually being reordered. Recognizing that an out-of-sequence packet is either reordered or has simply been retransmitted due to a prior loss is key to eliminating reordered packets from the retransmission count. Reordered packets will not be retransmitted and will cause over-reading of both the loss and the retransmission counts. Moreover, below a certain threshold, where a retransmission is not triggered reordering will have less impact upon the end user's experience.

Full determination of the cause of an out-of-sequence arrival requires knowledge of whether a packet is late due to retransmission or is just reordered. TCP will retransmit a packet when either the current retransmission timeout (RTO) value at the sender has passed without it having received an acknowledgement for that packet, or, in more recent TCP implementations, when three successive duplicate acknowledgements have been seen at the sender, in a method known as "fast retransmission".

In their paper, "Measurement and Classification of Out-of-Sequence packets in a Tier-1 IP Backbone", Jaiswal et al. present a measurement study and classification methodology for out-of-sequence packets in TCP connections. Their work builds on that of Paxon, as described in his paper "End-to-end Internet Packet Dynamics", IEEE/ACM Transactions on Networking, June 1999 and on that of Bennett et al, as described in their paper "Packet Reordering is not Pathological Network Behaviour". Their aim was to classify the causes of out-of-sequence packets. By observing properties of the forward path packets carrying the TCP segments observed, such as time of observance, the packet's IP Identification field, the existence of the segments reverse path ACK packets, and some derived measures, such as the time difference between two occurrences of the same TCP segment, the presented methodology allows categorization of out of sequence packets into one of 5 types. These are; 1 "Retransmission", 2 "Unneeded Retransmission", 3 "Network Duplicate", 4 "Reordering", and 5 "Unknown".

However, as part of their mechanism they rely on two things, among others, to allow their measurement to work. Namely, that they have to observe the return path ACK packets, and that they have an accurate estimation of the senders "round trip delay, RTT" and "retransmission timeout interval, RTO". There are simply too many complex heuristics used in this method to make a simple, lightweight and reliable measurement. Moreover Jaiswal et al. found only approximately 13% of the monitored flows to be symmetrical, without the return path flow symmetry the remaining 87% of the captured flows could not be measured using their technique.

In the IP Performance Metrics Working Group's working paper "Reordering Metric for IPPM" Morton et al, (draft-ietf-ippm-reordering-10.txt) it is suggested that byte counts are used as sequence numbers to show transmission order. This is an on-the-fly method that uses next-expected-sequence numbers, rather like EP1111871, to recognise out-of-sequence packets. However, the use of packet byte counts makes it difficult to calculate the position of a packet in a stream on-the-fly without recording the size of the intervening packets. It is also suggested in the paper that packet sizes are stored, but no mechanism for calculating sequences when the intervening packets themselves are also reordered is offered.

Out-of-sequence packets in the reverse path, or acknowledgement path, also affect TCP transmission. Bennett et al describe in "Packet Reordering is not Pathological Network Behaviour", how out-of-sequence packets in the acknowledge path cause TCP to loose its self-clocking property with forward path transmission becoming bursty, hence affecting data transmission.

In summary, several attempts have been made to offer an accurate single point measurement of loss, goodput and retransmission. None of these measurements, though, have been proven to be both accurate, to within acceptable tolerances, and be lightweight enough so that they can be run in real-time and for many concurrent flows.

The present invention therefore seeks to provide a method for real time monitoring of TCP flows, which overcomes, or at least reduces the above-mentioned problems of the prior art.

SUMMARY OF THE DISCLOSED EMBODIMENTS

Accordingly, in a first aspect, the invention provides a method for real time monitoring of at least one TCP flow comprising: monitoring TCP packets flowing past a particular point in a TCP/IP network, determining a flow trace including at least source and destination addresses and source and destination port numbers for each TCP packet, creating a packet record for each monitored TCP packet within a determined flow trace, the packet record including at least a transmitted order number and an actual received sequence number, determining an expected flow position number for each packet record from the list of all packet records in the flow trace sorted by Sequence Number and IPID, and determining a difference between the expected received flow number for each packet record and the actual received flow number for that packet record to thereby determine by how much a particular packet was moved out of sequence.

In one embodiment the method further comprises determining a difference between the expected received position number for each packet record and the expected received position number for the previous packet record to thereby determine by how much a particular packet was moved out of sequence.

The method may further comprise determining the ratio of the rate of change of actual received position numbers to the rate of change of the expected received position numbers. The ratio may be determined over a number of packet records of at least two.

In one embodiment, each packet record further includes information relating to time of receipt of that packet with respect to the previous packet arrival time and the method further comprises determining the rate of change of inter-packet arrival times. The rate of change of inter-packet arrival times can be determined over a number of packet records of at least two.

The expected position number can be calculated from the TCP Transmission Sequence Number provided by the source of the packets. Alternatively, the expected position number can be calculated from the IP ID of the packet in systems where the IP ID increases by one for each transmitted packet in a given flow.

The number of retransmitted packets can be provided by the number of packet records having the same expected position number. The Goodput measure can be provided by the number of packets transmitted less the number of retransmitted packets.

The number of out-of-sequence packets can be provided by the number of packet records having expected position and observed position numbers that are not identical.

In one embodiment, the TCP packets relating to the same flow can be monitored at different points in the network, and the flow traces are provided to a correlator for further analysis of anomalies in the network.

BRIEF DESCRIPTION OF THE DRAWINGS

One embodiment of the invention will now be more fully described, by way of example, with reference to the drawings, of which:

FIG. 7 shows an example bidirectional stream capture, with the respective OP measurement, according to one embodiment of the present invention;

FIG. 8 shows the TCP packet records that would be generated using one embodiment of the present invention;

FIG. 9 shows the results of the packet sequencing analysis of FIG. 4 for absolute measurement of sequence loss, according to one embodiment of the present invention;

FIG. 10 shows the results for a Packet Sequence Rate of Change Analysis as applied to the packets from FIG. 7 according to one embodiment of the present invention;

DETAILED DESCRIPTION

Figure 1:
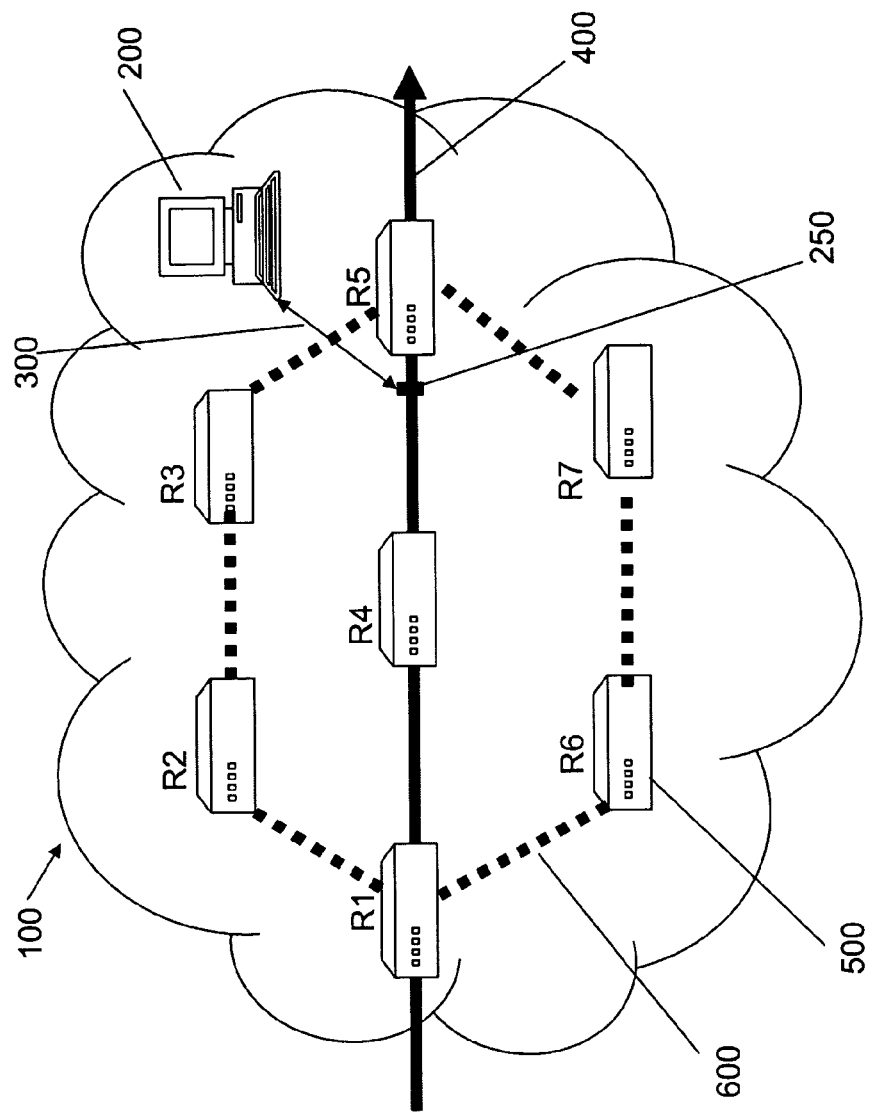
FIG. 1 shows a diagram of a TCP network according to one embodiment of the present invention.

In a brief overview of one embodiment of the present invention, there is shown in FIG. 1 a network 100 such as the Internet, comprising a series of network elements, such as Routers 500 labelled R1 to R7, each of which may be connected via a series of links 600. Each link extends between two routers, with a communication path, such as path 400, through the network generally being formed of one or more links extending from a start router (or other element) to an end router (or other element). A Network Management Station (NMS) 200, is coupled at some point to the network to provide network management functions, including providing information regarding the quality of paths through the network that are being monitored.

Packets passing through such an arbitrary point 250 on communication path 400 in the network 100 may be examined. A probe coupled to NMS 200 can be connected via a network tap 300 to the arbitrary point 250 in communication path 400, and can be placed near router R5, for example, or at any point in the network 100 where TCP flows can be observed. The probe monitors the packets that go by. Whenever a packet is observed that matches specific criteria relating to the measurements of interest, the time that the packet is observed (and, possibly, other data relating to the packet) is recorded and the information is sent to the NMS 200. The probe may batch up these results, sending multiple results in a single packet to reduce network overhead. Measurement is performed on a per flow basis. For each flow, a "flow trace" is created, the trace consists of a series of "packet records" where each record consists of information about each packet in the flow. As each packet record is processed, it is stored in memory at the NMS and packet records are formed, as will be described in more detail below with reference to FIGS. 2 and 3.

Figure 2:
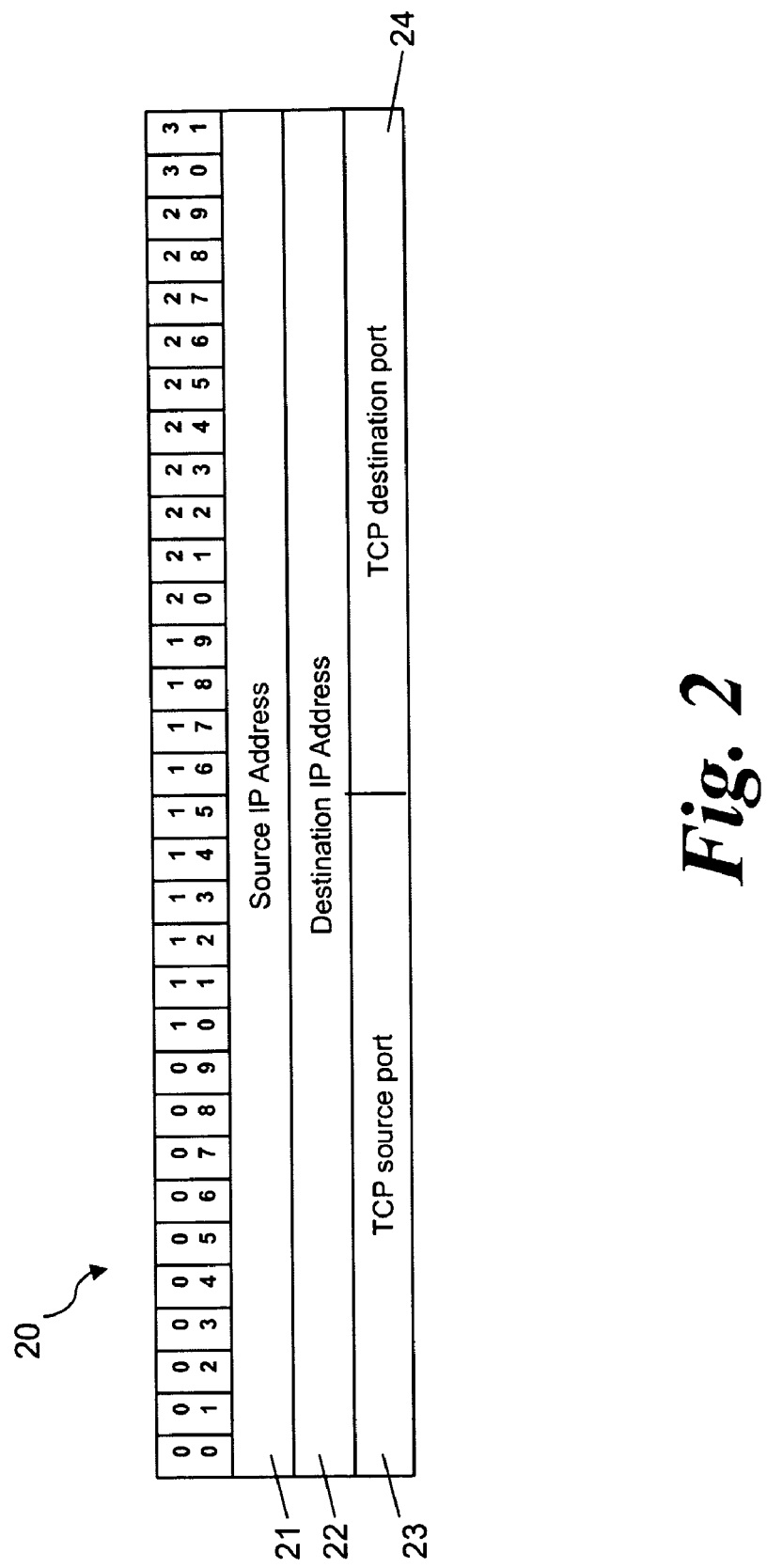
FIG. 2 schematically shows part of a TCP packet header of a packet record.

A TCP connection is uniquely identifiable using the IP addresses of the source and destination nodes, and the port numbers on those nodes between which the connection has been established. FIG. 2 shows part of a TCP packet header 20 that provides the identification by which each packet record is stored according to one embodiment of the present invention. Thus, the TCP packet header 20 has a format that includes the Source IP Address 21, Destination IP Address 22, TCP source port 23, and TCP destination port 24. For each flow trace, packet records are formed for all packets that relate to that flow trace and the packet records are stored in the memory of the NMS, as mentioned above, although the memory could be located elsewhere, if desired.

For each TCP flow starting with the first marked packet, called the TCP SYN packet in forward direction flows, and the TCP SYN-ACK in reverse direction flows, the packet's headers are examined and a packet record is added to the flow trace. The packet source and destination IP addresses and TCP ports (21, 22, 23, 24) are used as the unique identifying key for each flow trace. On each packet arrival a new packet record is added to the flow trace. The contents of the packet record is described in further detail with reference to FIG. 3.

Figure 3:
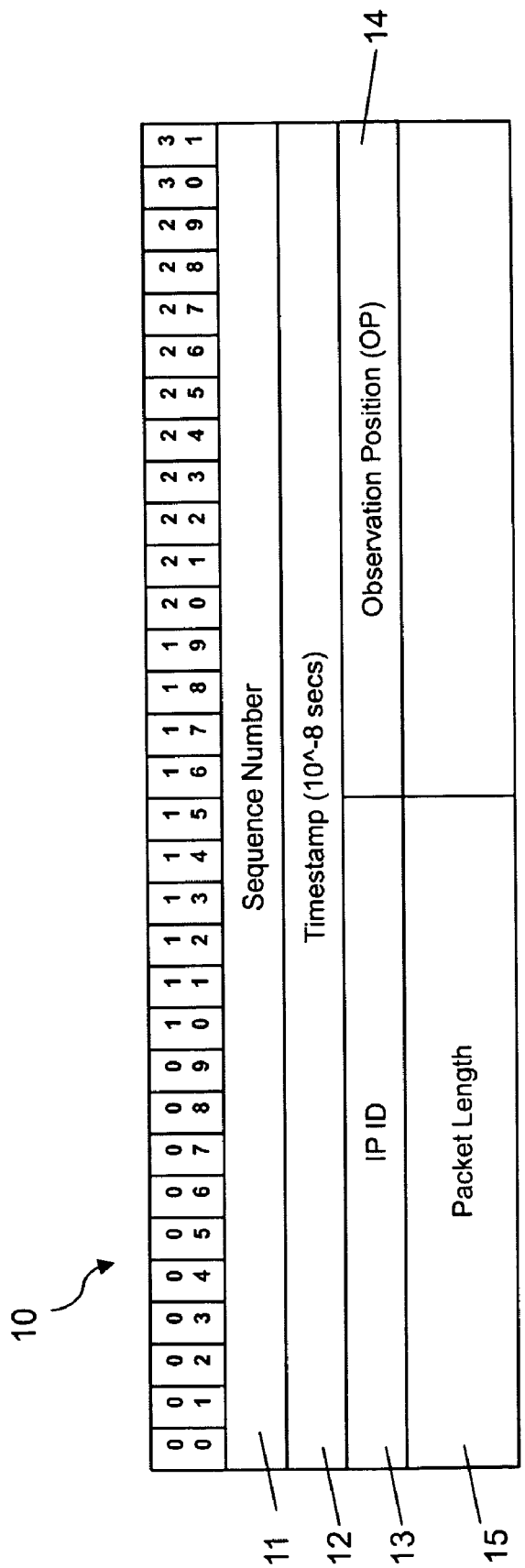
FIG. 3 shows a diagram of a TCP packet record according to one embodiment of the present invention.

FIG. 3 is a schematic diagram of the contents of a TCP packet record 10 according to one embodiment of the present invention. The packet record 10 consists of 14 bytes and comprises a sequence number 11, the IP ID (identification) 13 of the packet, the timestamp 12 of its arrival at a network probe, an incrementing sequence number, called the 'Observation Position' (OP) 14 and a packet length 15.

The OP 14 is provided by an integer counter within the probe device, that is used to record the arrival position of each packet observed in the flow at the measurement position. The counter is initialised to zero when a new flow trace is created, and is incremented by one on the arrival of each new packet for a given direction within that flow. Separate OP 14 counters are maintained for each flow trace and each direction within the flow currently being monitored by a network probe.

The timestamp 12 measures the time elapsed between the current packet's arrival, and the arrival of the previous packet. For example, if this time was recorded in 10's of nanoseconds, ($10^{-8}$ seconds), an inter-packet gap of just under 43 seconds could be accommodated (this would equate to a 100 MHz clock inside a probe device).

The OP 14 counter, IP ID 13 and Packet Length 15 may be 16 bit numbers with a range 0 to 65535. The IP ID 13 can be arbitrarily set by the sender, but should change on each packet transmitted, thereby providing a method for identifying network duplicates of packets with identical Sequence 11 and Ack numbers.

The OP 14 counter may recycle back to 0 after reaching 65535. Since this number is used to determine packet sequencing and packets are unlikely to arrive at more than a few tens of positions out of sequence, the 65535 limit is adequate for most connections. If measurements over a very long flow are required, a larger counter could be used.

Each TCP packet sequence number 11 is a 32 bit number. Storage could be optionally further reduced by minimising the memory storage requirements for each flow record 10 by normalising the sequence numbers 11, with respect to the start of the sequence numbers for that flow for a given direction. To avoid number exhaustion, at least a 24 bit number would be required, this would save 1 byte. Monitoring certain applications may require a longer timestamp period to accommodate longer inter packet arrival times, for example, to support protocols that contain natural pauses in the TCP connection. In this instance, a larger timestamp, for example 40 bits (5 bytes) long would provide slightly over 3 hours. This change, coupled with the 24 bit sequence number, would align the record on a 4 byte storage boundary, which can be useful on certain commodity hardware. The length of the various elements in the trace record can be adapted to suit the type of protocols being monitored and the type of hardware resources available on the probe.

Figure 4:
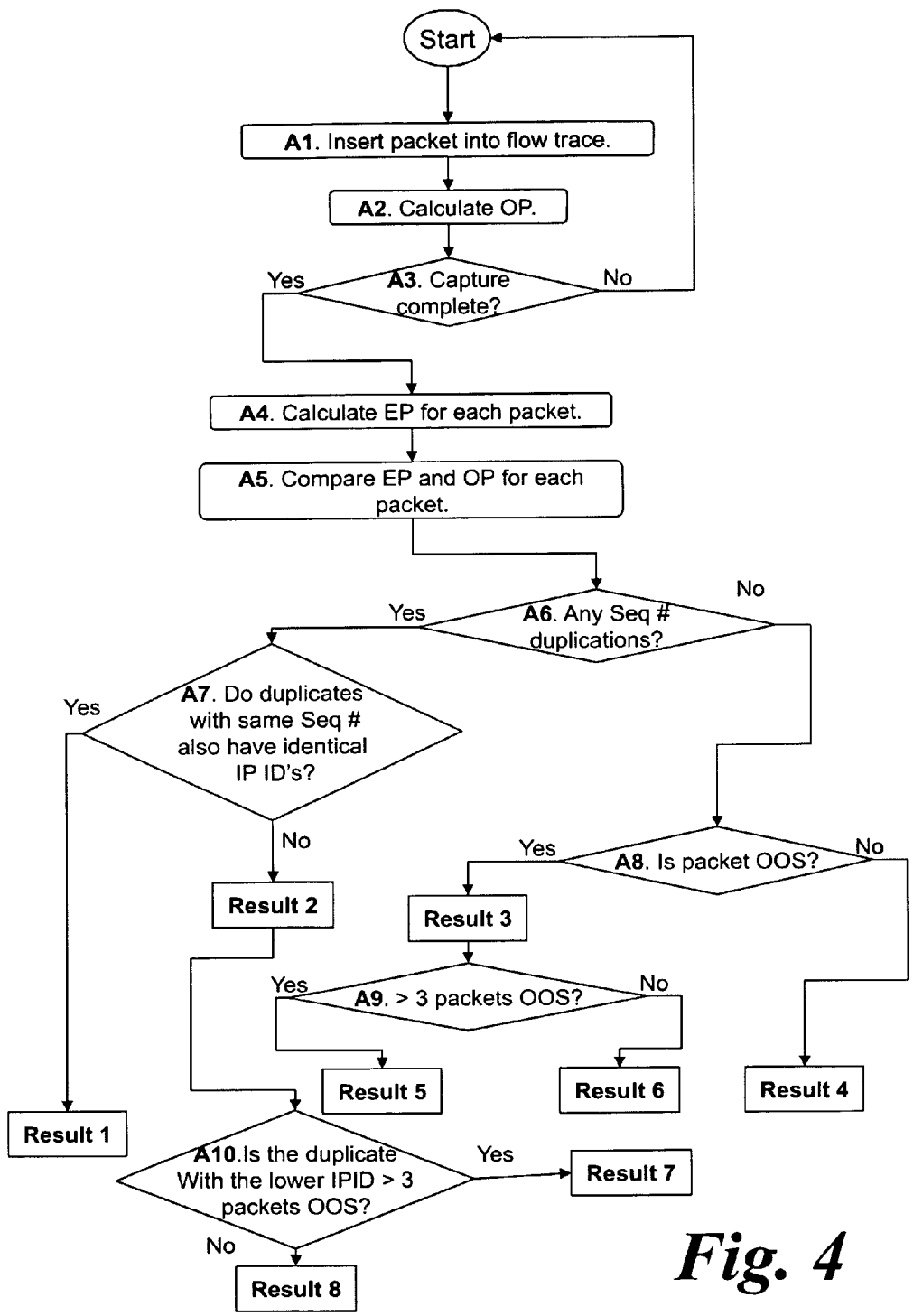
FIG. 4 is a flow diagram of a packet sequencing analysis, according to one embodiment of the present invention.

FIG. 4 is a flow diagram of a Packet Sequencing Analysis according to one embodiment of the present invention, wherein the steps shown are further described below:

A1. On arrival each packet record is inserted into a flow trace (as described above with reference to FIG. 2). However, the insertion does not occur in arrival order. Insertion occurs in a sorted order keyed against the "Sequence Number" and "IP ID". The sort is characterised (in pseudo code) as the function shown below:

```
boolean sort(Record a, Record b) {
    if (a.sequenceNumber == b.sequenceNumber) {
        return a.ipid < b.ipid;
    } else {
        return a.sequenceNumber < b.sequenceNumber;
    }
}
``` where each "Record" has a structure of the type previously described with reference to FIG. 3. Using this sort function, a packet record will be placed in the flow trace ordered from the lowest "Sequence Number" to the largest "Sequence Number". For packets with the same "Sequence Number" the "IP ID" is used to differentiate. Although packets could just as easily be sorted against just the "Sequence Number", using both numbers gives an increased level of differentiation between packets that are retransmissions and those that were caused by network duplication.

A2. Assign OP for each packet inserted into flow trace. The OP indicates the actual arrival order of the packets within the flow, and the "Sequence Number" provides the order that the packets were actually transmitted. A number of very useful measures can be derived from this information.

A3. Is packet capture complete?
If Yes, go to A4
If No, go to Start
Either when a TCP FIN (finish), TCP RST (reset) or in case these are missed, after a suitable timeout period, the whole of the captured flow-trace can be analysed. If the processing resources are not available at the probe the trace could be sent to the network management station for analysis, or alternatively analysis could be performed at the probe itself. Any results generated are either stored and displayed via the probe, or via the network management station.

A4. The analysis of the flow trace (when finished, reset or after the timeout) starts with a calculation of an "Expected Position" (EP) number for each packet record within the flow trace. The calculation of EP for each packet record is described in further detail with reference to FIG. 5.

A5. Compare EP and OP numbers for each packet. The following steps can be used to interpret the results.

A6 Are there any packets in the flow trace with the same Sequence Number?
If YES, go to A7
If NO, go to A8.

A7 Do packets that are have the same Sequence Number, also share the same "IP ID"?
If Yes, go to Result 1.
If No, go to Result 2 and then A10.

A8 Are any packets Out-Of-sequence (OOS), indicated by comparison of EP and OP numbers?

If Yes, Result 3 then A9.
If No, Result 4

A9. Are any packets more than three packets Out-Of-sequence (OOS)?
If Yes, go to Result 5
If No, go to Result 6

A10. Of the packets with the same sequence number, is the packet with the lower IP ID, more than three packets Out-Of-sequence (OOS)? (IP ID will always increase until it reaches its maximum value of 65535 at which point it will return to 0 and continue to increase again; rollover of the value should be accounted for when performing this calculation.)
If Yes, go to Result 7
If No, go to Result 8

Result 1: Packets that are duplicated in the flow record and share the same Sequence Number and IP ID are marked as network duplicates, and a count of the number of network duplicates should be maintained. These should be rare, but nevertheless, this is a useful measure for one form of potentially pathological network behaviour.

Result 2: Packets that are duplicated in the flow record, sharing the same Sequence Number, but are not network duplicates, as determined by A7, are retransmissions of packets, and a count of this should be maintained. The cause of this retransmission is a result of
  Packet reordering, either upstream or downstream from the measurement point.
  OR
  Packet loss downstream from the measurement point, due to network congestion or malfunction of the network.

Result 3: Packets that are Out-Of-sequence and are not duplicated in the flow record will be due either to:
  Packet reordering upstream from the measurement point.
  OR
  Packet loss upstream from the measurement point due to network congestion or malfunction, which has then resulted in a retransmission of the lost packet.

Result 4: Perfect Network Behaviour. In an ideal case with no loss of sequence, for example, EP==OP for all values.

Result 5: Packets that are categorised as being Out-Of-Sequence, and that are significantly Out-Of-Sequence, but do not share a duplicate packet in the flow record as tested by A6, can be assumed to be caused by
  Packet loss upstream from the measurement point, as a significantly late arrival of the packet will have triggered either a fast-retransmit from the receiver, or a Round-Trip-Timeout at the sender. This would be the case for packets that are significantly more than 3 positions Out-Of-Sequence, as a large delay would be incurred whilst a retransmission was transmitted.
  Packet reordering upstream and downstream from the measurement point, which has not been to a large enough degree to cause a retransmission through RTT or Fast-Retransmit, but indicates significant disruption in network behaviour, and should be measured as such.

The degree to which packets are being measured out-of-sequence should be maintained, as significantly numbers of packets arriving more than 3 position out-of-sequence, is an indicator of unhealthy network performance.

Result 6: Packets that are categorised as being Out-Of-Sequence, but are less than three packets Out-Of-Sequence are a result of packet reordering upstream from the measurement point. This is indicative of unhealthy network performance and a count of this measure should be maintained, but these packets do not indicate problems with network performance as serious as those categorised under Result 5, as they are unlikely to cause unnecessary retransmissions.

Result 7: Packets that are categorised as Result 2 and have duplicate packet records, but where the packet record with the lower IPID value is more than three packets out-of-sequence, are retransmissions that are likely to be the result of the TCP receiver receiving three duplicate acks and determining the packet must be retransmitted. This is the amount of fast retransmission occurring in the flow and a count of this should be maintained.

Result 8: Packets that are categorised as sharing the same Sequence Number, but not being network duplicates, but where the packet record with the lower IP ID value is less than three packets Out-Of-Sequence, are retransmissions that could have been caused either by:
  The TCP transmitter's RTO (retransmit timer) firing. This is the amount of fast retransmission occurring in the flow and a count of this should be maintained
  OR
  Reverse-Path reordering or loss, resulting in ACKs not arriving at the transmitter as expected, and causing retransmissions.

Ultimately this technique provides a measurement for any packet that is Out-Of-Sequence, which is an excellent indication of the actual absolute amount it is Out-Of-Sequence and a good indication of the reason for the packets' sequencing.

Figure 5:
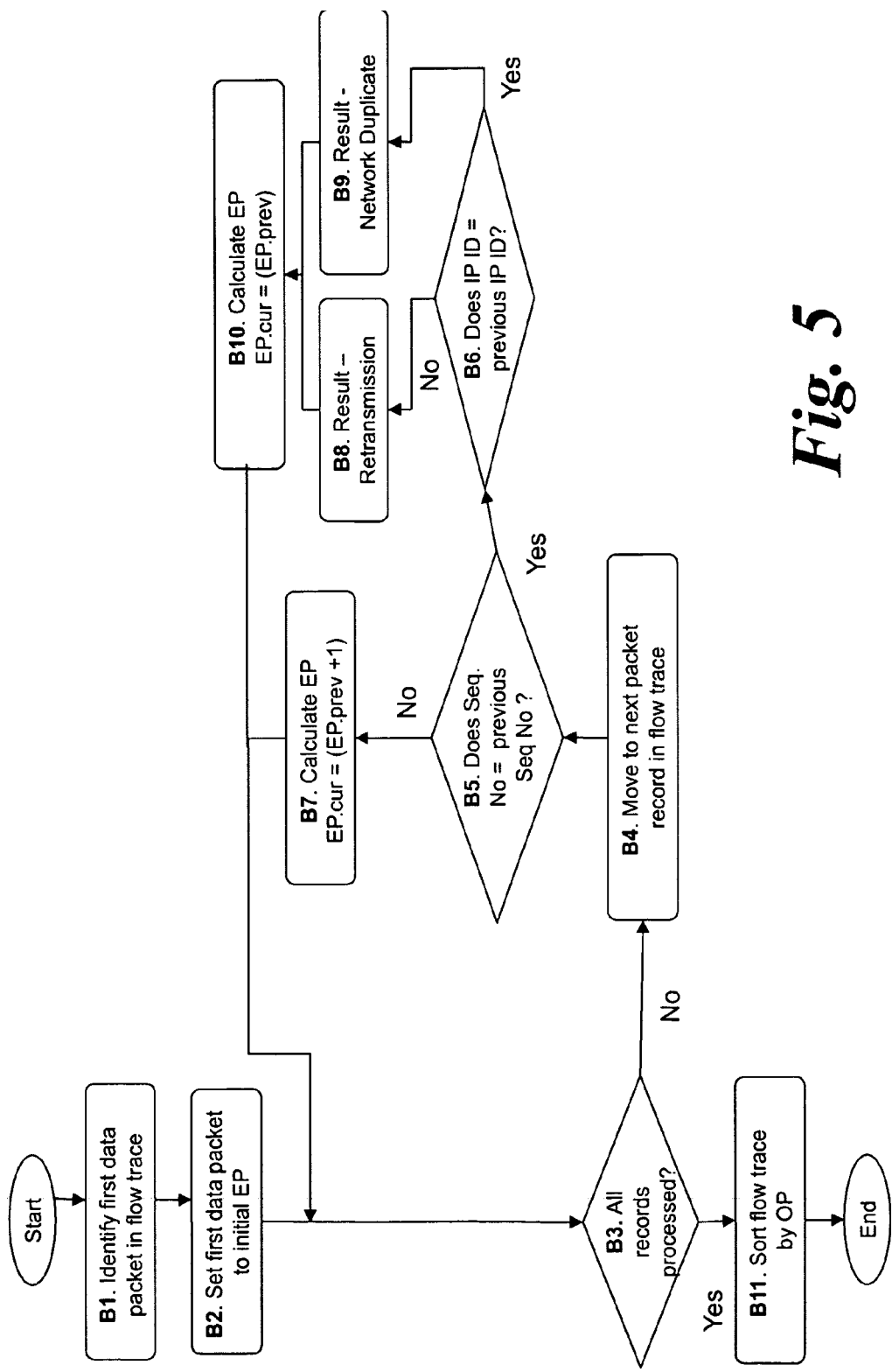
FIG. 5 is a flow diagram of one of the steps of FIG. 4.

FIG. 5 describes A4 of FIG. 4, being the calculation of an "Expected Position" (EP) number for each packet record within the flow trace. Upon completion of the packet capture, all packet records within the flow trace have been entered in sorted order keyed against "Sequence Number" and "IP ID". The steps shown to calculate EP are further described below:

B1. The first data packet record in the flow trace is found. This is identified as having an identical Sequence Number as the original flow SYN packet, but with different IP ID fields and a packet length not equal to zero.

B2. The first data packet is assigned the initial EP number. For example, the initial EP could be set to the same as the OP of the first data packet, thus allowing simple comparison between the two values, and thereby allowing EP==OP as an indication of perfect sequencing.

B3. Have all packet records in flow trace been processed?
If No, go to B4
If Yes, go to B11

B4. Move on to next packet record in flow trace

B5. Is Sequence Number of current packet record, identical to Sequence Number of previous packet record?
If Yes, go to B6
If No, go to B7

B6. Is IP ID of current packet record, identical to IP ID of previous packet record?
If Yes, go to B9
If No, go to B8

B7. Calculate EP value of current packet record, as EP value of previous packet record plus 1.

B8. This instance is an indication of a packet retransmission and can be marked as such.

B9. This instance is an indication of a network duplicate and can be marked as such.

B10. Set EP value of current packet record, to the same value as the EP value of the previous packet record.

B11. Sort all packet records within the flow trace, by OP (Observation Position).

Figure 6:
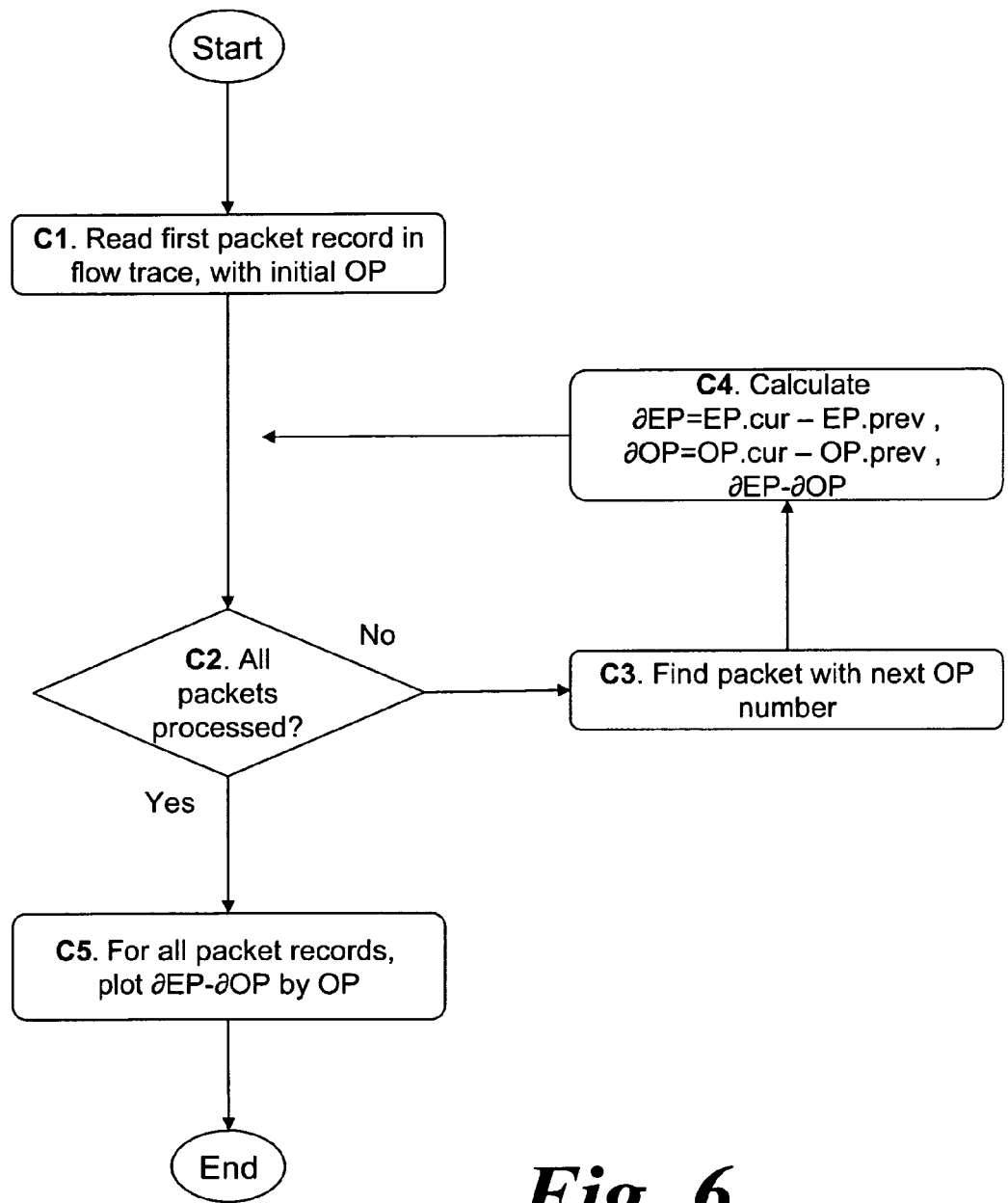
FIG. 6 is a flow diagram of a further post-processing analysis technique according to an embodiment of the invention.

FIG. 6 shows an example of post processing that may be carried out on a flow trace, after completion of OP and EP calculation.

C1. Find packet record in flow trace with initial OP value
C2. Have all packet records in flow trace been processed?
   If Yes, go to C5
   If No, go to C3
C3. Find the next Observed Packet in the flow trace, by searching for the packet record with the next OP number.
C4. Perform the following calculations on the EP (EP.cur) and OP (OP.cur) values of the current packet record, with respect to the EP (EP.prev) and OP (OP.prev) values of the previous packet record.
   $\partial$EP=EP.cur−EP.prev
   $\partial$OP=OP.cur−OP.prev
   $\partial$EP−$\partial$OP
C5. For each packet record, calculate the value $\partial$EP−$\partial$OP, by OP, for ease of viewing this can then be plotted as a graphical display.

FIG. 7 shows an example of both directions of a single TCP stream capture, with the respective OP measurement, according to one embodiment of the present invention. Analysis of this sequence of packets, would be carried out using two separate flow traces, one for each direction—

Flow Trace 1) 10.0.0.2:1789 to 10.0.0.6:35427
Flow Trace 2) 10.0.0.6:35427 to 10.0.0.2:1789

Upon termination of the connection, when Flow Trace 1 is observed transmitting a RST or FIN, the results are processed and the EP numbers are calculated (as demonstrated in FIG. 5).

FIG. 8 shows the TCP packet records that would be generated by the packet sequencing analysis using TCP stream capture data, shown in FIG. 7, according to one embodiment of the present invention.

FIG. 9 shows the results of a packet sequencing analysis for absolute measurement of sequence loss using Flow Trace 1 according to one embodiment of the present invention. It can be seen from the table of results, given in FIG. 9 that the packet with Expected Position 6 was reordered during transmission, and was observed arriving at position 7. The degree of sequence loss was great enough to cause a retransmission—this can be seen as the packet arriving at Observed Position 12.

FIG. 10 shows the results for a Packet Sequence Rate of Change Analysis as applied to the packets from FIG. 8 according to one embodiment of the present invention. Empirical observation has indicated that a good indicator of the 'health' of a TCP connection is the rate of change of sequence numbers. TCP receivers expect to receive packets from a flow in order, and so an out of sequence packet, whatever the cause, indicates a breakdown which causes additional overhead to the connection through retransmissions, this demonstrates the requirement for buffering at the receiver or congestion avoidance techniques.

Using a Packet Sequence Rate of Change Analysis, in an ideal case EP should increase by exactly 1 per packet—i.e. every packet received should be that predicted from the previous packet. Therefore, if applied across a sequence of more than two packets sorted by their observed position, if $$\frac{\partial EP}{\partial OP} = 1$$

the connection is shown to be completely in sequence.

This Packet Sequence Rate of Change Analysis can measure the effects of packet reordering, by highlighting the points at which the observed sequence changes, rather than identifying packets as being either in or out of sequence.

Even minor loss of sequence would suggest that a connection is an 'unhealthy' connection, as the change in sequence could be misinterpreted as loss by the receiver, in which case an retransmission would be caused, and congestion avoidance would begin.

The distance in packets over which to apply the differentiation is an important factor to consider and wil be governed by the receiver's maximum tolerance to sequence breakdown before adverse effects in transmission would be observed. For example, in existing TCP implementations, if a packet is more than three positions out of sequence, this would trigger the fast retransmission method which would cause an unnecessary retransmission and a closure of the congestion window. Therefore, sequence breakdown where a packet is less than three packets distant from is true position is potentially of little consequence to the transmission rate of the TCP flow.

From the timestamp data within each packet record, the rate of change of inter-packet arrival times can also be calculated. The difference in inter-arrival times differentiated over a distance of packets, selected in a similar method to that described for rate of sequence change, would allow for an indication of the burstiness of the data. If both forward and reverse flow traces were obtained, comparison of these would allow for measurements of reverse path reordering and how it affected the forward path's burstiness.

FIG. 10 further illustrates the use of the $\partial$EP, $\partial$OP, and $\partial$EP−$\partial$OP calculation when performing packet sequence rate of change analysis. When retransmissions occur in a flow, this embodiment of the invention will allocate EP numbers to retransmitted packets that are identical to the original 'lost' packet. In a situation where there are multiple retransmissions of the lost packet, or where reordering occurs to such an extent that the receiver has assumed the packet to be lost, requested retransmission, and then both the late packet and retransmitted packet have subsequently arrived, there will be multiple packet records in the flow trace with identical EP numbers. Meanwhile, the OP counter will increase linearly for each packet arrival, which after a retransmission event when the flow has returned to correct sequencing, will have resulted in the OP counter being ahead of the EP counter by the number of packet retransmissions that have occurred.

Therefore calculating the change in EP and OP between packets provides a measure of sequence change that is relevant in situations where retransmissions will affect the expected sequence of arriving packets.

Furthermore, the analysis described in this embodiment of the invention will always result in $\partial$OP having a value of 1 when calculated over 2 packet records, as OP increases linearly during packet capture. Therefore, when calculating $\partial$EP/$\partial$OP, a value of anything other than 1 is an indication of sequence breakdown. This is important, as it allows the measurement to accurately monitor packet sequencing after a breakdown has occurred.

For example, in FIG. 10 a sequence gap is detected at OP 6 where EP 6 has undergone packet reordering, and arrives in OP 7. In this example, the reordering was sufficient to cause a retransmission of the packet at EP 6 which is observed again at OP 12. In the intervening time between OP 9 and OP 11, packet sequencing is maintained as expected, with EP=OP, and so $\partial$EP/$\partial$OP would indicate good network behaviour for this part of the flow.

After the anomaly of the retransmission at OP 12, $\partial$EP/$\partial$OP from OP 14 onwards indicates that the flow trace is back in perfect sequence—despite OP and EP becoming 'out of step' due to the additional retransmission.

Calculation of $\partial$EP−$\partial$OP provides another useful measurement of packet sequencing, and an indication of how 'late' or 'early' a packet has been measured as arriving with respect to the expected sequence of arrival. A healthy TCP flow with perfect sequencing will be indicated as ∂EP−∂OP=0, for all packets in the flow record.

For example, in FIG. 10, OP 6 is calculated as having ∂EP−∂OP=1, indicating that the packet has arrived 1 position early, than what it should be expected to be. Calculation of ∂EP−∂OP on OP 7=−2, indicating that the packet has arrived 2 positions late. Calculation of ∂EP−∂OP on OP 12=−6, indicating that the packet is 6 positions late, and with an EP of 6 (which has also been assigned to the packet with OP 7) indicates that this is a retransmission, caused by either downstream packet loss, or packet reordering.

It should be noted that due to this retransmission in the flow record, packets OP 14 to OP 20 do not have identical EP values, even although they have arrived 'in sequence' with respect to the overall flow, this is due to the retransmitted EP 6 packets that require two OP positions.

Calculation of the ∂EP/∂OP and ∂EP−∂OP described in this manner provides a means for removing the effect of the 'out of step' effect of retransmissions, thus providing indicators of TCP connection health.

Calculation of ∂EP−∂OP provides a useful method of analysing packet sequencing, which is further described below with reference to FIG. 11.

Figure 11:
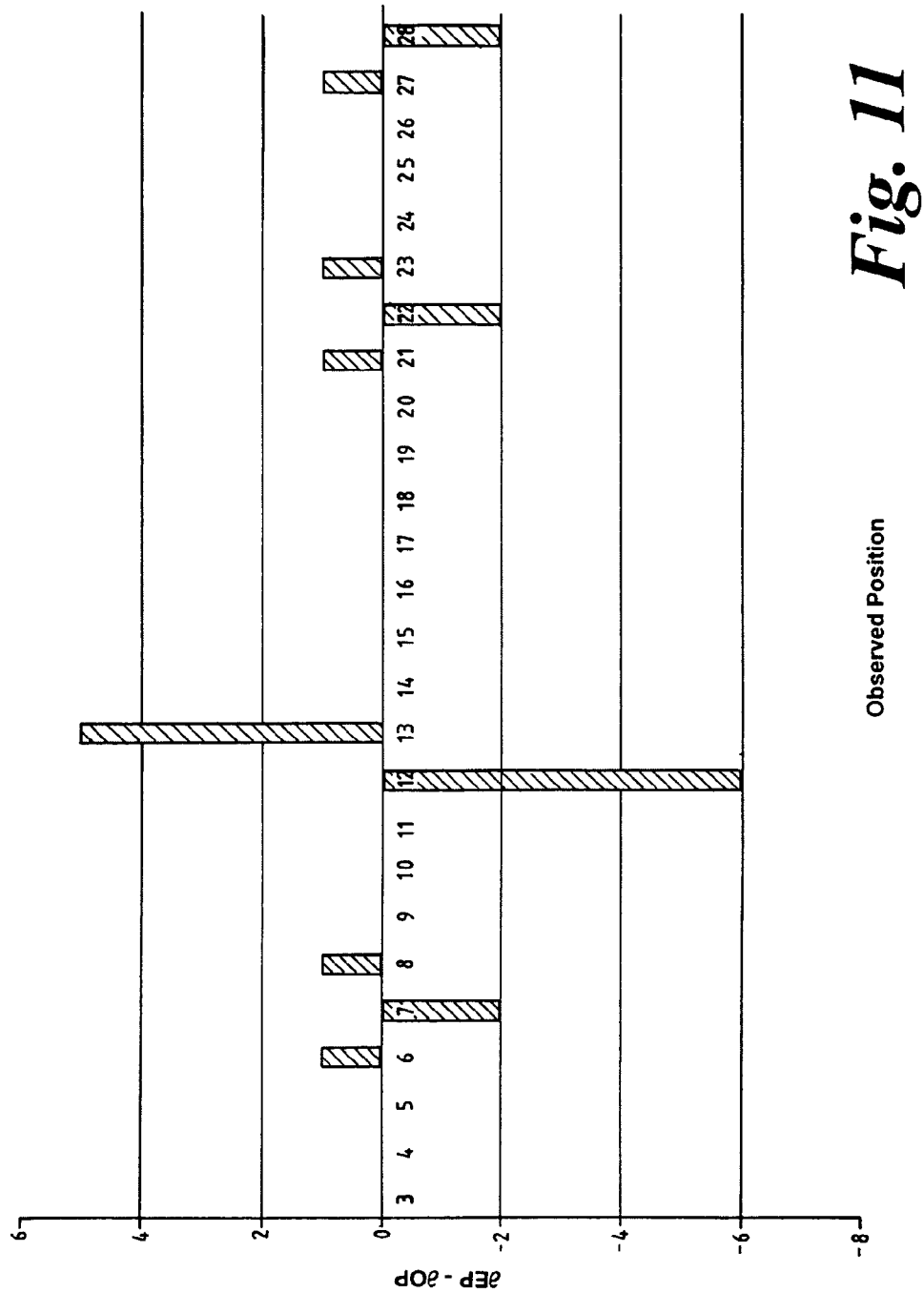
FIG. 11 shows a graphical analysis of the Packet Sequence Rate of Change Analysis of FIG. 10.

FIG. 11 shows the results of packet sequencing analysis, and the graphical representation that can be obtained by considering ∂EP−∂OP over the range OP for a measurement taken of the packets discussed with reference to FIG. 7.

The effect of calculating ∂EP−∂OP is to effectively 'cancel out' the packets that have arrived in perfect sequence, as these will have ∂EP−∂OP=0. This results in a graph which indicates the positions in the flow trace where sequence breakdown was apparent.

As shown in FIG. 11, positions on the graph below the X-axis indicate packets that were considered to have arrived with observed positions 'later' than their expected positions. This is the case for reordered packets, or those which have been retransmitted. On the other hand, positions on the graph above the X-axis indicate packets that were considered to have arrived with observed positions 'earlier' than their expected positions.

Graphs with many peaks are an indication of poor packet sequencing and hence poor link quality. Graphs with the majority of points on the 0 line of the X-axis, are an indication of good packet sequencing and high link quality.

Figure 12:
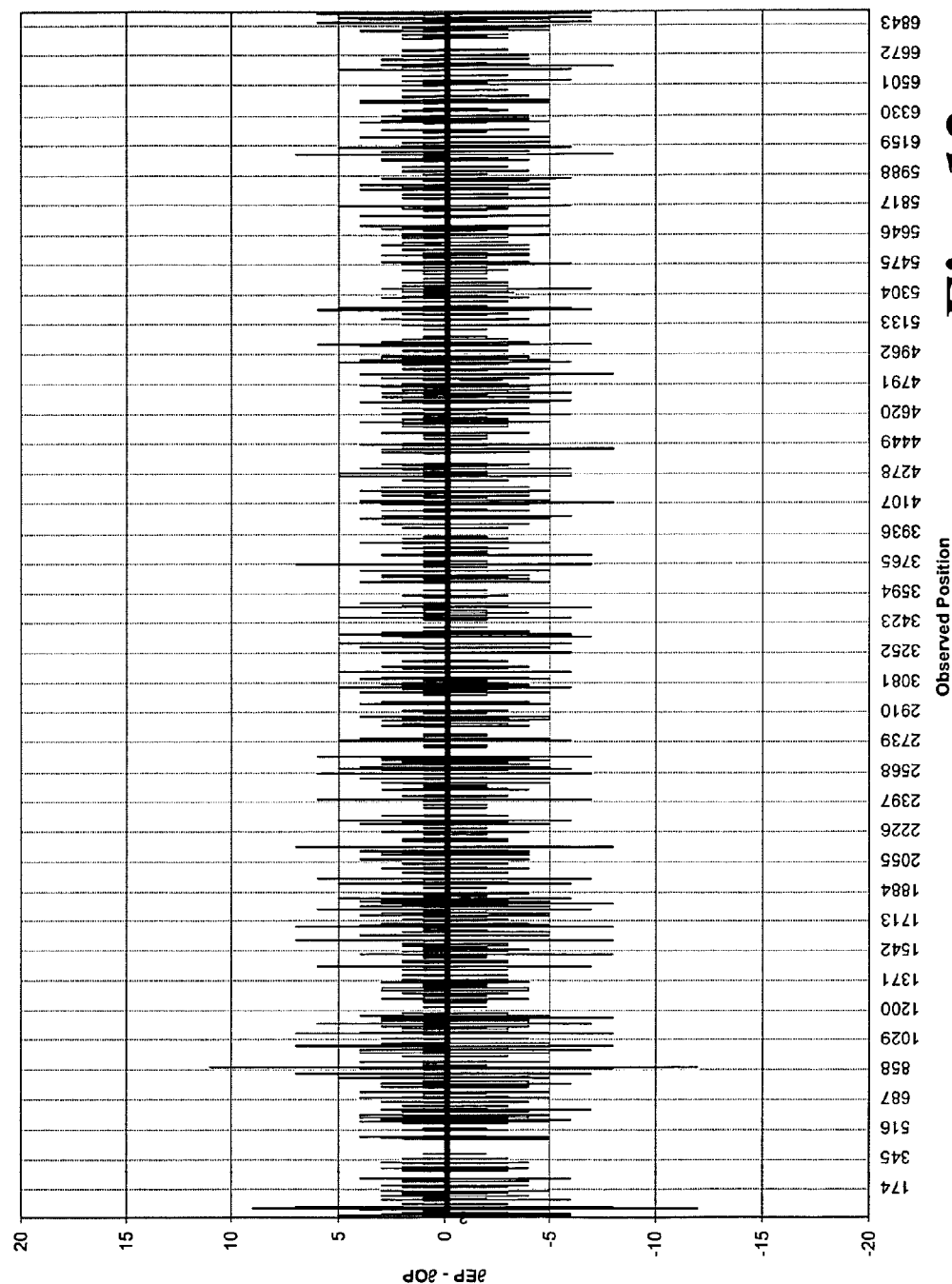
FIG. 12 shows a graphical analysis of the Packet Sequence Rate of Change Analysis of one real network.

FIG. 12 illustrates a further example of ∂EP−∂OP analysis, employed on a real communications network. The flow trace was obtained from a network probe transferring a 10 Megabyte file over a link with a round-trip delay time of 0.002 seconds between source and destination. A router mid-point in the connection was configured to cause packet reordering to a random 10% of the packets of this flow, where each packet selected to be reordered, was delayed by 0.0001 seconds.

Through analysis of the flow trace as described above with reference to FIG. 4, a total of 6 packets were measured as retransmissions; 3 of these retransmissions were caused by a fast-retransmission request from the receive. FIG. 12 gives an overall visual indication of the health of the flow by plotting '∂EP−∂OP' against 'Observed Position'. As can be seen, the majority of packets appear less than 3 positions late or early, with significant parts of the flow where perfect sequencing has been achieved, and ∂EP−∂OP is shown as 0. The calculation of ∂EP−∂OP also provides an excellent indication of the periods during the transmission of the 10 megabyte file sequence when breakdown occurred. In this example, ∂EP−∂OP has been plotted against Observed Position Packet Number, but this could as easily be plotted against Sequence Number, or as a function of time.

Figure 13:
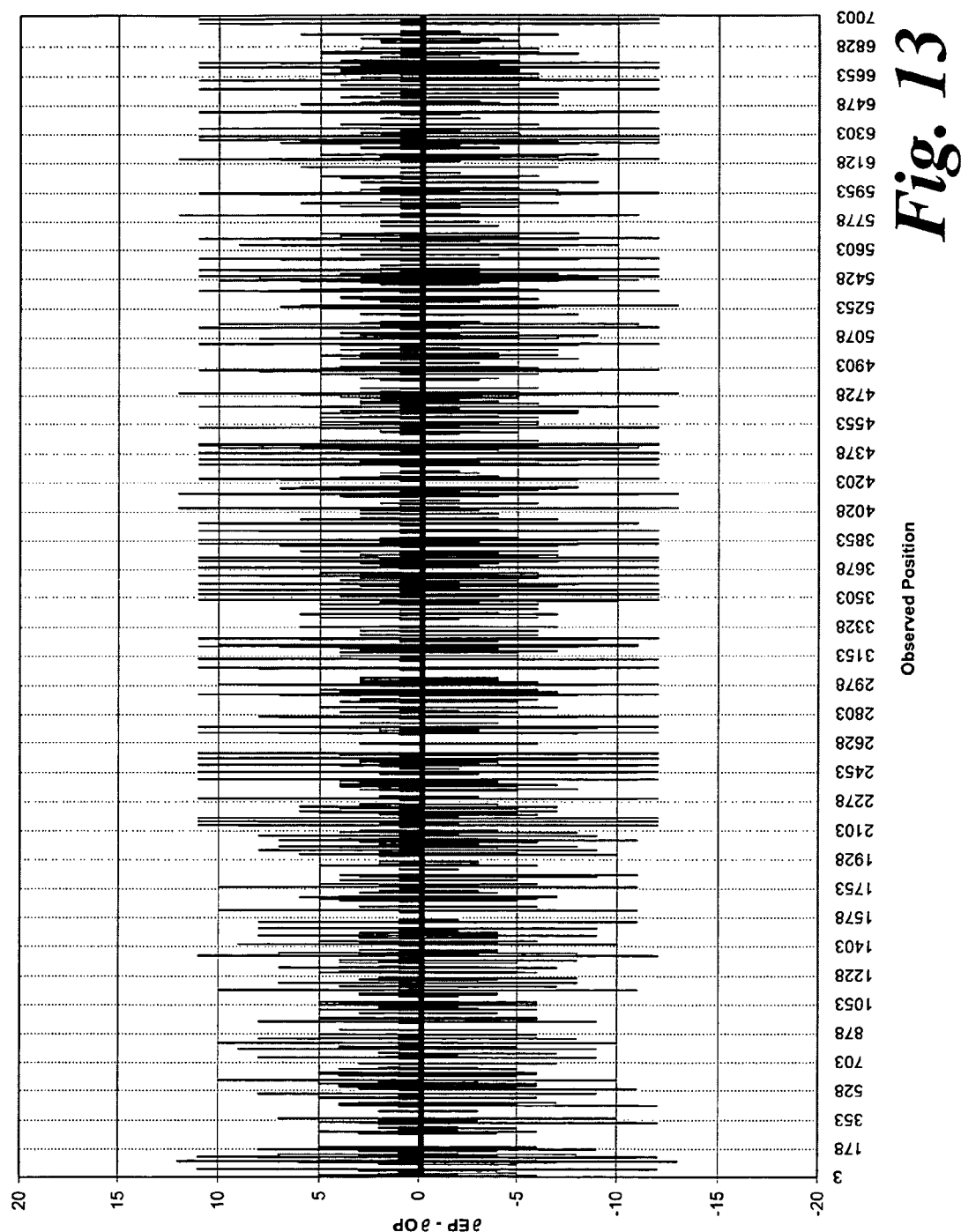
FIG. 13 shows a graphical analysis of the Packet Sequence Rate of Change Analysis of another real network.

FIG. 13 illustrates ∂EP−∂OP analysis applied to another 10 Megabyte file transmitted across a communications network, with round-trip delay time of 0.002 seconds between source and destination, and with 10% of all packets reordered by 0.0005 seconds. Application of the measurements described above with reference to FIG. 4 indicates a total of 94 retransmissions, of which 79 were caused by fast-retransmit. Visual inspection of FIG. 13 shows that there are significantly more packets arriving out of sequence, and that ∂EP−∂OP is equal to 0 for only short periods during the flow. The range of 'early' and 'late' positions packets is significantly greater than in FIG. 12, as are the distribution of packets arriving more than 3 positions out of sequence.

Figure 14:
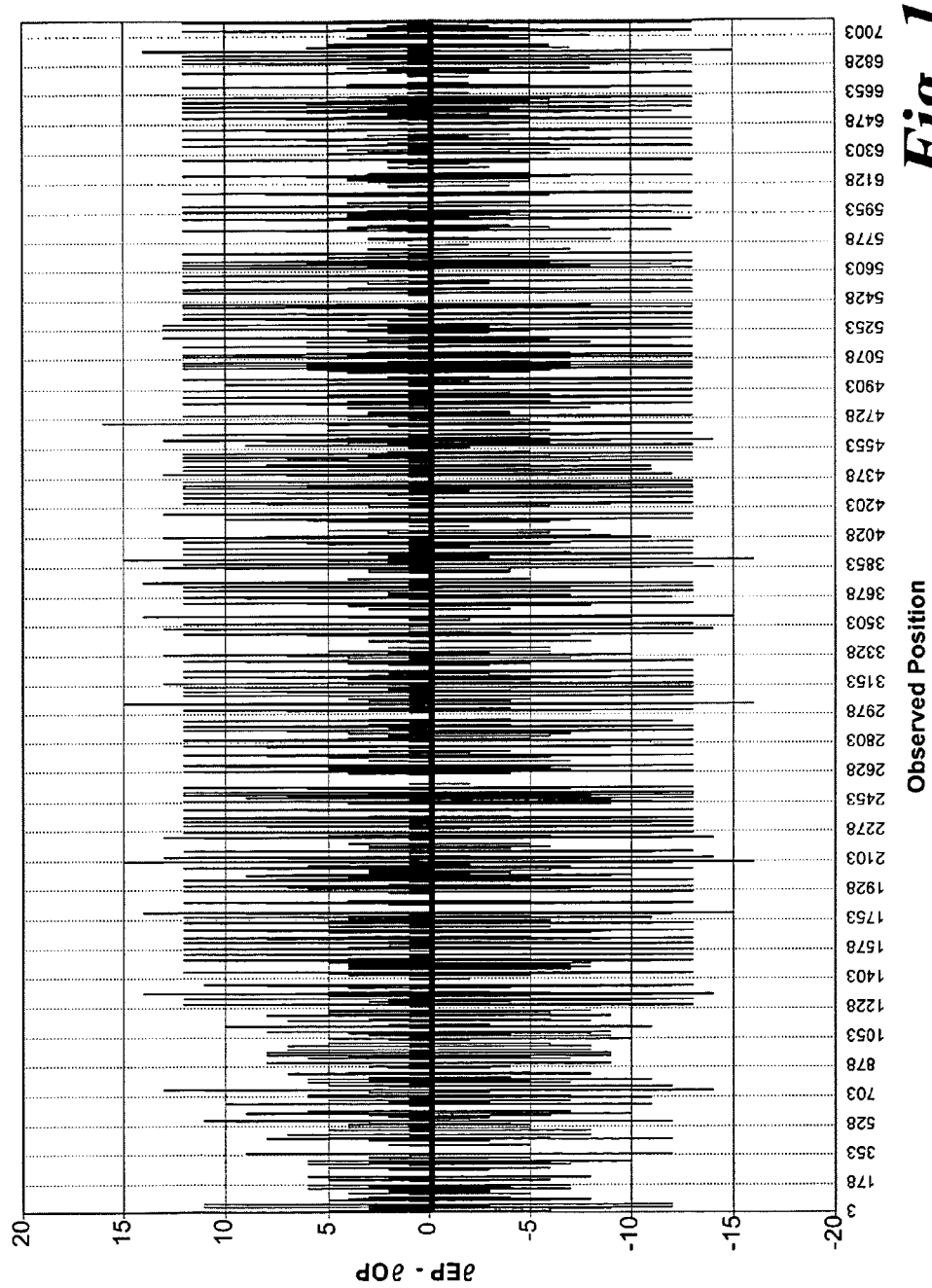
FIG. 14 shows a graphical analysis of the Packet Sequence Rate of Change Analysis of a third real network.

FIG. 14 illustrates a third example of ∂EP−∂OP analysis applied to another 10 Megabyte file transmitted across a communications network, with round-trip delay time of 0.002 seconds between source and destination, and with 10% of all packets reordered by 0.001 seconds. Application of the measurement analysis described above with reference to FIG. 4 indicates that in the flow depicted, there were 172 retransmissions, of which 162 were caused by fast retransmission. The Figure shows ∂EP−∂OP and illustrates that the majority of packets in this connection are out of sequence, with many packets distributed over a large range of ∂EP−∂OP values.

FIG. 14 also illustrates that a connection can become even unhealthier over time, as can be seen by the distribution of ∂EP−∂OP over the first third of the connection, where fewer packets are shown to be extremely late or early, thus providing in insight to the degenerative nature of packet reordering on a connection.

The above describes a method for measuring a TCP flow in the forward (data) direction. Modification of this method to measure sequencing in the reverse (ACK) direction is also possible, by using the same method as described above with reference to FIG. 4, but by sorting using Acknowledgement Number and IP ID.

In some implementations of IP network interface cards, the IP ID field acts as an integer counter which increases by 1 on each packet transmitted by that card. The specifications simply state that IPID must be unique for that source-destination pair and protocol for the time the datagram will be active in the Internet system, it would therefore be possible to alter the driver of any network interface card to behave differently so that it matched the existing requirements but that IPID was also unique between active TCP streams on that card. The IPID would then increase per packet, per protocol and, in addition per TCP port.

Using the IPID as the method of recording the OP, and estimating the Expected Position of the packets from the first observed IPID, would provide a method of comparing EP and OP with post flow analysis performed exactly as described for forward path connections.

Analysis would therefore not have the same storage requirements as there is no need to save neither the sequence number, nor the acknowledgement number from each packet. Furthermore, the flow records could be sent to a correlator so that further measurements could be performed.

A more accurate goodput measure, that can be made as an arbitary measure mid point in the flow, can be estimated by calculating the number of bytes observed to have been sent by the sender minus the number of retransmissions observed at that point. A retransmitted packet will be correctly identified within the flow trace, and reordered packets will not be misinterpreted as retransmissions.

By observing a single trace at several points, an accurate picture of where packet anomalies are introduced, can be obtained. After initial processing, a summary of the flow records could be sent to a correlator so that further measurements requiring both forward and reverse packet sequencing could be performed.

In applications where the memory is at a premium, a rolling window of packets can be kept. The window could be configurable in size, with an approximate size of 16 having been empirically shown to be sufficient.

For example, in a GBIC (Gigabit Interface Converter) based implementation that has approximately 512 Kb memory for packet records, then it is possible to store 2048 concurrent packet traces at 16 bytes per packet-records with a rolling 16 records in packet. Alternatively, once the store is full each block of records could be sent to a correlator.

The above described embodiment provides apparatus that can be placed at any point throughout the network connection and can provide an accurate and dependable measure of loss, retransmission and sequencing at that location. This measurement can operate accurately in the face of reordering, whilst not requiring access to the acknowledgement stream on the reverse path.

The above described embodiment also provides a method of performing a measurement that indicates the rate of change of packet sequencing, i.e how often the sequence breaks down and the level of that breakdown. TCP's susceptibility to sequence number break down varies. For example, TCP is quite robust in the face of either a high frequency of low magnitude sequence breakdown and low frequency of high magnitude breakdown. At a high frequency and low level of sequence breakdown, packet re-transmission does not occur and the receiver is able to use buffering to compensate. At a low frequency of high magnitude sequence breakdown TCP is able to re-adjust and re-open the congestion window between the breakdown events. In between however, the congestion window does not get a chance to reopen and TCP throughput can be dramatically reduced. A high rate of change of sequence number breakdown with respect to time is indicative of poor transmission quality.

Finally, the above described embodiment provides a method for measuring packet sequencing in the reverse direction, which is useful to determine the quality of the data transmission. This measure can be independent of the forward path measurements i.e. no requirement for the two measurements to be run concurrently on the same flow on the same device. The measurement is useful for determining if loss or packet reordering on the reverse path is causing TCP to loose its self-clocking properties. Burstiness of forward path packet delivery increases as a consequence of high reverse path packet reordering. A correlation between the forward path burstiness and the sequence of acknowledgements would indicate those flows with high reverse path reordering exhibiting a highly bursty forward path.

The above described embodiment is intended to operate at line speed for a large number of concurrent flows. The embodiment provides a method that is lightweight, does not require the presence of reverse path acknowledgements for the monitored forward path, and provides an accurate estimation of loss, retransmission and packet sequencing. Furthermore, the method does not require access to an accurate shared notion of time (timesync), nor does it use large amounts of memory to monitor each flow.

Using the method provided by the above described embodiment, there is no requirement to instrument both senders and receivers, allowing this embodiment to be employed on any TCP connection at any point throughout the network.

Furthermore, there are no complex heuristics required, nor any computationally intensive calculations. The embodiment does not require access to the measured connection's reverse path acknowledgements, allowing forward and reverse path analysis to be performed separately or together—depending whether they both flow through the same node or not.

The above described embodiment provides a simple method for true packet sequencing measurement, allowing the probe to precisely calculate how far a packet has been moved out-of-sequence; and from this extrapolate the cause of this loss of sequence and potential effects this could have on the connection. In situations of extreme reordering and loss, this embodiment allows simple calculation of the absolute reordering distance, without requiring computationally and memory intensive calculations of intervening Next Expected Sequence Number.

Furthermore, this embodiment offers the ability to differentiate between network duplicates and retransmissions caused by reordering. This is shown by the record of two packets with the same sequence number, but different IP IDs.

The above described embodiment gives a more accurate picture of goodput since it can recognize the majority of under-reporting caused by packet re-ordering.

The embodiment can accurately measure packets that are out-of-sequence but cannot determine if they occurred as a result of loss or retransmission. These are the packets which were less than three out-of-sequence, and therefore have not generated a fast-acknowledgement.

The embodiment also provides a measurement of goodput that does not fail in the face of packet reordering, and can be performed at an arbitrary point in the network since it can, at that point in the network, "see" retransmission.

The embodiment allows the estimation of burstiness of data packets, and a comparison of this burstiness with the degree of sequence loss that is observed in the flow.

It will be appreciated that although only one particular embodiment of the invention has been described in detail, various modifications and improvements can be made by a person skilled in the art without departing from the scope of the present invention.

The invention claimed is:

1. A method for real time monitoring of at least one transmission control protocol (TCP) flow, the method implemented in at least one of a probe, and a probe connected to a network management station (NMS), the method comprising:

monitoring, via a probe, TCP packets flowing past a particular point in a TCP network;

at least one of the probe and an NMS connected to the probe:

determining from the TCP packets a flow of TCP packets having the same source and destination addresses and the same source and destination port numbers, wherein each TCP packet in the flow has a transmitted sequence number indicating a transmission sequence;

counting the TCP packets in the flow to provide an actual received sequence number for each TCP packet in the flow, the actual received sequence number indicating an actual reception sequence, by:

assigning an initial actual received sequence number to a first TCP packet in the actual reception sequence; and assigning an actual received sequence number to each particular TCP packet other than the first TCP packet that corresponds to the actual received sequence number of the TCP packet immediately before the particular TCP packet in the actual reception sequence plus one;
creating a packet record for each TCP packet in the flow, the packet record including the transmitted sequence number and the actual received sequence number of that TCP packet;
creating a flow trace;
sorting the packet records by transmitted sequence number to provide the transmission sequence;
inserting the packet records into the flow trace in the transmission sequence;
determining an expected received sequence number for each packet record in the flow trace, the expected received sequence number indicating an expected reception sequence, by:
assigning an initial expected received sequence number to a first packet record in the transmission sequence, wherein the initial expected received sequence number is equal to the initial actual received sequence number; and
if the transmitted sequence number of a particular packet record other than the first packet record does not match the transmitted sequence number of the packet record immediately before the particular packet record in the transmission sequence, assigning an expected received sequence number to the particular packet record that corresponds to the expected received sequence number of the packet record immediately before the particular packet record in the transmission sequence plus one; or
if the transmitted sequence number of a particular packet record other than the first packet record matches the transmitted sequence number of the packet record immediately before the particular packet record in the transmission sequence, assigning an expected received sequence number to the particular packet record that corresponds to the expected received sequence number of the packet record immediately before the particular packet record in the transmission sequence; and
comparing the expected received sequence number to the actual received sequence number for each packet record to thereby determine by how much the TCP packet associated with that packet record has moved out of sequence.

2. A method according to claim 1, further comprising:
sorting the packet records within the flow trace by actual received sequence number;
to provide the actual reception sequence wherein for each packet record a change in actual received sequence, corresponding to a difference between the actual received sequence number of that packet record and the actual received sequence number of the packet record immediately before that packet record in the actual reception sequence, is equal to one;
determining a change in expected received sequence number for each packet record by calculating a difference between the expected received sequence number of that packet record and the expected received sequence number of the packet record immediately before that packet record in the actual reception sequence; and
comparing the change in expected received sequence number to the change in actual received sequence number for each packet record to thereby determine by how much the TCP packet associated with that packet record has moved out of sequence.

3. A method according to claim 2, wherein comparing the change in expected received sequence number to the change in actual received sequence number for each packet record to thereby determine by how much the TCP packet associated with that packet record has moved out of sequence comprises:
determining a rate of change of expected received sequence number with respect to actual received sequence number by calculating a ratio of the change in expected received sequence number to the change in actual received sequence number for each packet record.

4. A method according to claim 2, the method further comprising the at least one of the probe and the NMS:
providing a number of reordered packets by determining for how many of the packet records the change in expected received sequence number does not match the change in actual received sequence number, and the expected received sequence number does not match the expected received sequence number of any packet record earlier in the actual reception sequence.

5. A method according to claim 2, wherein comparing the change in expected received sequence number to the change in actual received sequence number for each packet record to thereby determine by how much the TCP packet associated with that packet record has moved out of sequence comprises:
determining a difference between the change in expected received sequence number and the change in actual received sequence number for each packet record.

6. A method according to claim 5, wherein comparing the change in expected received sequence number to the change in actual received sequence number for each packet record to thereby determine by how much the TCP packet associated with that packet record has moved out of sequence further comprises:
plotting the difference between the change in expected received sequence number and the change in actual received sequence number for each packet record against actual received sequence number, transmitted sequence number, or time.

7. A method according to claim 1, further comprising:
sorting the packet records by actual received sequence number to provide the actual reception sequence;
determining a change in actual received sequence number for a sequence of at least three packet records in the actual reception sequence;
determining a change in expected received sequence number for the sequence of at least three packet records in the actual reception sequence; and
determining a rate of change of expected received sequence number with respect to actual received sequence number by calculating a ratio of the change in expected received sequence number to the change in actual received sequence number for the sequence of at least three packet records in the actual reception sequence.

8. A method according to claim 1, wherein each packet record further includes information relating to time of receipt of the TCP packet associated with that packet record, the method further comprising the at least one of the probe and the NMS:
determining an inter-packet arrival time for each packet record; and
determining a rate of change of inter-packet arrival time.

9. A method according to claim 8, wherein the rate of change of inter-packet arrival time is determined with respect to expected received sequence number.

10. A method according to claim 8, wherein the rate of change of inter-packet arrival time is determined with respect to actual received sequence number.

11. A method according to claim 8, wherein the rate of change of inter-packet arrival time is determined over a number of packet records of at least three.

12. A method according to claim 1, wherein the transmitted sequence number comprises a TCP transmission sequence number provided by a source of the TCP packets in the flow.

13. A method according to claim 1, wherein the transmitted sequence number comprises an internet protocol identification (IP ID).

14. A method according to claim 13, wherein the transmitted sequence number further comprises a TCP transmission sequence number provided by a source of the TCP packets in the flow, the method further comprising the at least one of the probe and the NMS:

providing a number of retransmitted packets by determining how many of the packet records include the same TCP transmission sequence number but a different IP ID.

15. A method according to claim 14, wherein counting the TCP packets in the flow to provide an actual received sequence number for each TCP packet in the flow further provides a number of transmitted packets, the method further comprising the at least one of the probe and the NMS:

providing a goodput measure by determining a difference between the number of transmitted packets and the number of retransmitted packets.

16. A method according to claim 13, wherein the transmitted sequence number further comprises a TCP transmission sequence number provided by a source of the TCP packets in the flow, the method further comprising the at least one of the probe and the NMS:

providing a number of duplicate packets by determining how many of the packet records include the same TCP transmission sequence number and the same IP ID.

17. A method according to claim 1, wherein the TCP packets in the flow are monitored at a plurality of points in the TCP network, the method further comprising the at least one of the probe and the NMS:

providing the packet records to a correlator for further analysis of anomalies in the TCP network.

18. A method according to claim 1, wherein TCP packets in a plurality of flows are monitored concurrently at the particular point in the TCP network.

* * * * *